United States Patent
Ackerman et al.

(10) Patent No.: US 10,015,843 B2
(45) Date of Patent: Jul. 3, 2018

(54) SLIDING WINDOW ASSEMBLY

(75) Inventors: Mark S. Ackerman, Brooklyn, MI (US); Dan Bennett, Tecumseh, MI (US); David W. Lahnala, Adrian, MI (US)

(73) Assignee: AGC AUTOMOTIVE AMERICAS CO., Alpharetta, GA (US)

( * ) Notice: Subject to any disclaimer, the term of this patent is extended or adjusted under 35 U.S.C. 154(b) by 1363 days.

(21) Appl. No.: 12/944,448

(22) Filed: Nov. 11, 2010

(65) Prior Publication Data

US 2012/0091114 A1    Apr. 19, 2012

Related U.S. Application Data

(63) Continuation-in-part of application No. 12/906,440, filed on Oct. 18, 2010, now abandoned, and a continuation-in-part of application No. 12/906,444, filed on Oct. 18, 2010, now abandoned.

(51) Int. Cl.
| | |
|---|---|
| *B60L 1/02* | (2006.01) |
| *E06B 7/28* | (2006.01) |
| *H05B 3/84* | (2006.01) |
| *B60J 1/18* | (2006.01) |
| *E05F 15/643* | (2015.01) |
| *E05F 11/53* | (2006.01) |

(52) U.S. Cl.
CPC .............. *H05B 3/84* (2013.01); *B60J 1/1853* (2013.01); *E05F 15/643* (2015.01); *E05F 11/535* (2013.01); *E05Y 2800/414* (2013.01); *E05Y 2900/55* (2013.01); *H05B 2203/016* (2013.01)

(58) Field of Classification Search
CPC .... B60J 1/1853; H05B 3/84; H05B 2203/005; H05B 2203/011; H05B 2203/014; H05B 2203/016; H05B 3/06; H05B 3/86; E05F 11/535; E05F 15/632; E05F 15/643; E05Y 2201/43; E05Y 2800/20; E05Y 2800/414; E05Y 2900/55
USPC ............. 219/203, 201; 49/70, 349, 352, 506
See application file for complete search history.

(56) References Cited

U.S. PATENT DOCUMENTS

| | | |
|---|---|---|
| 3,544,737 A | 12/1970 | Nowak |
| 4,388,522 A | 6/1983 | Boaz |
| 4,920,698 A | 5/1990 | Friese et al. |
| 5,542,214 A | 8/1996 | Buening |
| 5,613,323 A | 3/1997 | Buening |

(Continued)

FOREIGN PATENT DOCUMENTS

| | | |
|---|---|---|
| DE | 19930541 A1 | 1/2001 |
| FR | 2932736 A1 | 12/2009 |
| WO | 03024156 A2 | 3/2003 |

OTHER PUBLICATIONS

English language abstract for DE19930541 extracted from espacenet.com database on Feb. 23, 2012, 9 pages.

(Continued)

*Primary Examiner* — Tu B Hoang
*Assistant Examiner* — Diallo I Duniver
(74) *Attorney, Agent, or Firm* — Howard & Howard Attorneys PLLC

(57) ABSTRACT

A sliding window assembly for a vehicle is disclosed. The assembly includes panels and heating grids coupled to respective panels for defrosting the panels. The assembly further includes a conductive element in continuous electrical connection to the panels for defrosting the panels.

44 Claims, 17 Drawing Sheets

(56) References Cited

U.S. PATENT DOCUMENTS

| | | |
|---|---|---|
| 5,716,536 A | 2/1998 | Yokoto et al. |
| 5,724,771 A | 3/1998 | Gipson |
| 6,014,840 A | 1/2000 | Ray et al. |
| 6,071,453 A | 6/2000 | Church |
| 6,204,480 B1 | 3/2001 | Woodward et al. |
| 6,255,624 B1 | 7/2001 | Boaz et al. |
| 6,382,697 B1 | 5/2002 | Mulder et al. |
| 6,598,931 B2 | 7/2003 | Tamura |
| 6,766,617 B2 | 7/2004 | Purcell |
| 7,568,312 B2 | 8/2009 | Dufour et al. |
| 2003/0110702 A1 | 6/2003 | Capriotti et al. |
| 2003/0182866 A1 | 10/2003 | Nestell et al. |
| 2004/0025439 A1 | 2/2004 | Purcell |
| 2006/0059781 A1 | 3/2006 | Berklich, Jr. et al. |
| 2006/0064934 A1 | 3/2006 | Vornbaumen et al. |
| 2006/0107599 A1 | 5/2006 | Luten |
| 2006/0174544 A1 | 8/2006 | Dufour et al. |
| 2008/0268672 A1 | 10/2008 | Sargent et al. |
| 2010/0122495 A1 | 5/2010 | Lahnala |
| 2010/0122496 A1 | 5/2010 | Lahnala |
| 2010/0146859 A1* | 6/2010 | Gipson et al. .................. 49/348 |
| 2010/0154312 A1* | 6/2010 | Gipson et al. .................. 49/360 |
| 2011/0030276 A1* | 2/2011 | Smith et al. .................. 49/70 |
| 2011/0147153 A1 | 6/2011 | Rutkowski et al. |
| 2011/0181071 A1 | 7/2011 | Schaff et al. |

OTHER PUBLICATIONS

English language abstract for FR 2932736 extracted from espacenet.com database on Mar. 9, 2012, 14 pages.

International Search Report for Application No. PCT/US2011/060455 dated Feb. 10, 2012, 4 pages.

International Search Report for Application No. PCT/US2011/060446 dated Feb. 17, 2012, 4 pages.

U.S. Appl. No. 12/944,444; Inventors Dan Bennett, Mark S. Ackerman and David W. Lahnala; filed Nov. 11, 2010; 60 pages.

International Search Report for Application No. PCT/US2012/022973 dated Apr. 3, 2012, 3 pages.

"Low Closure Form, Foam Core EMI Gaskets" for Soft-Shield 4000 Series extracted from the website: http://www.chomerics.com; 3 pages.

"Technical Data Sheet" for Pres-On P9100/P9200 Tape extracted from the website: http://www.pres-on.com/shared/pdf/P9100_9200.pdf; 2 pages.

* cited by examiner

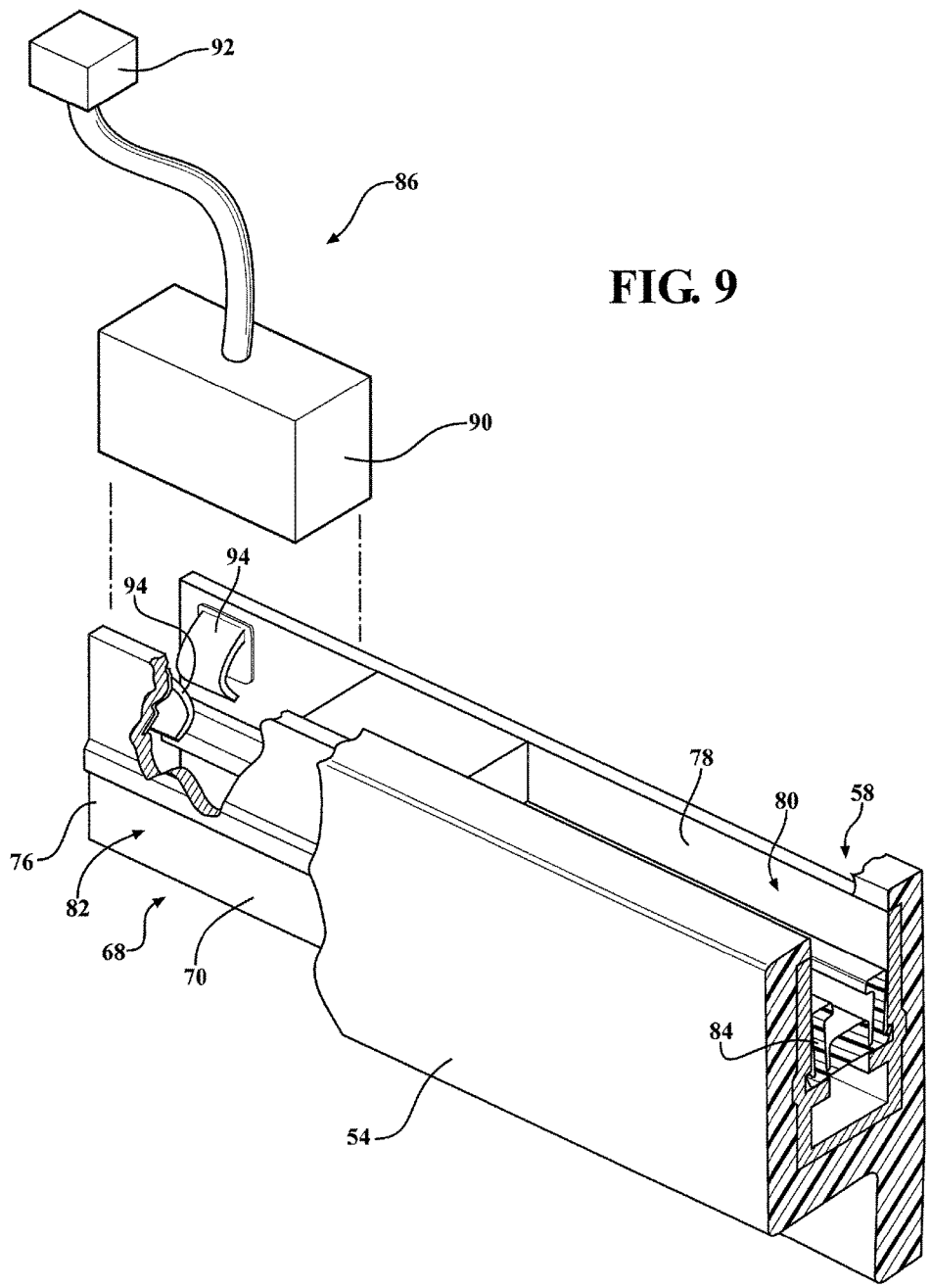

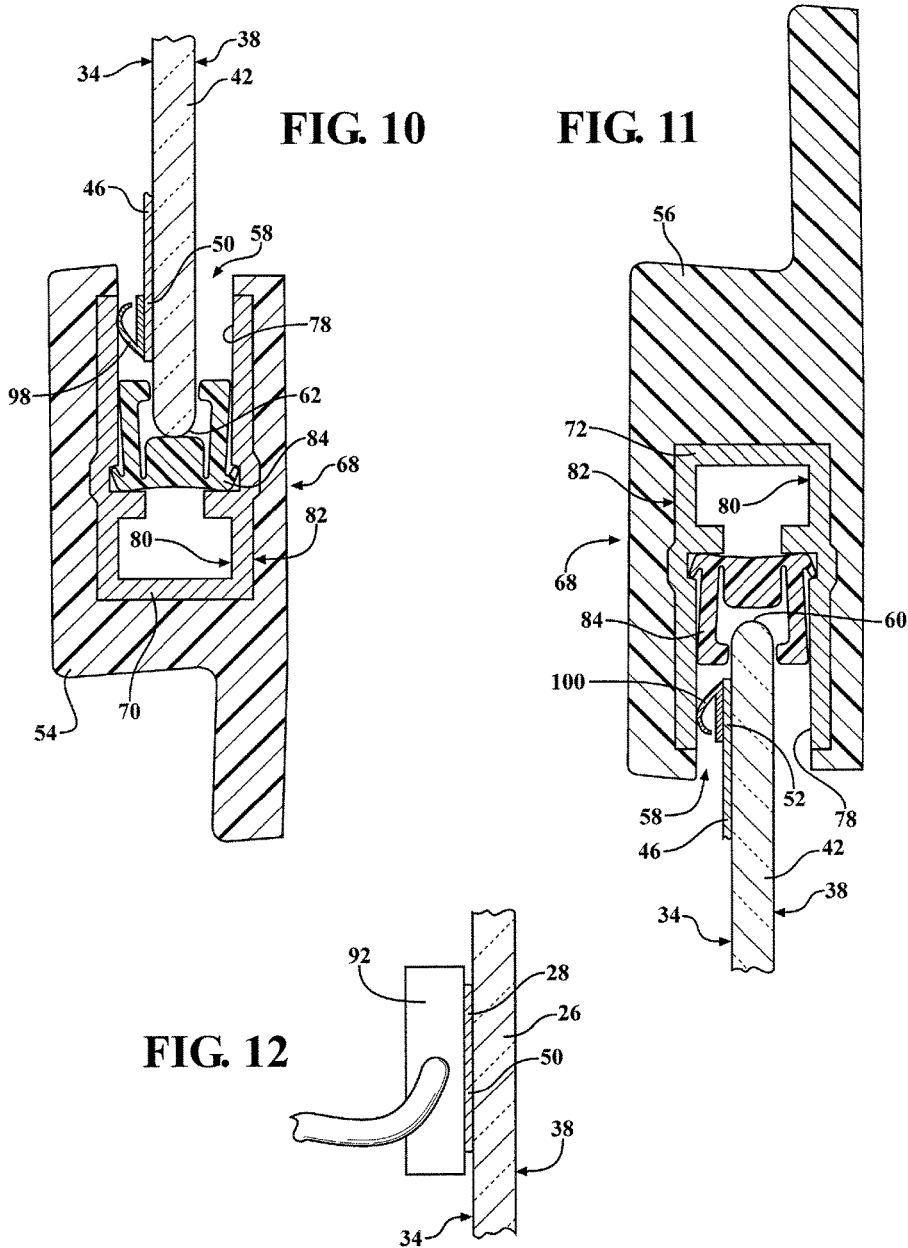

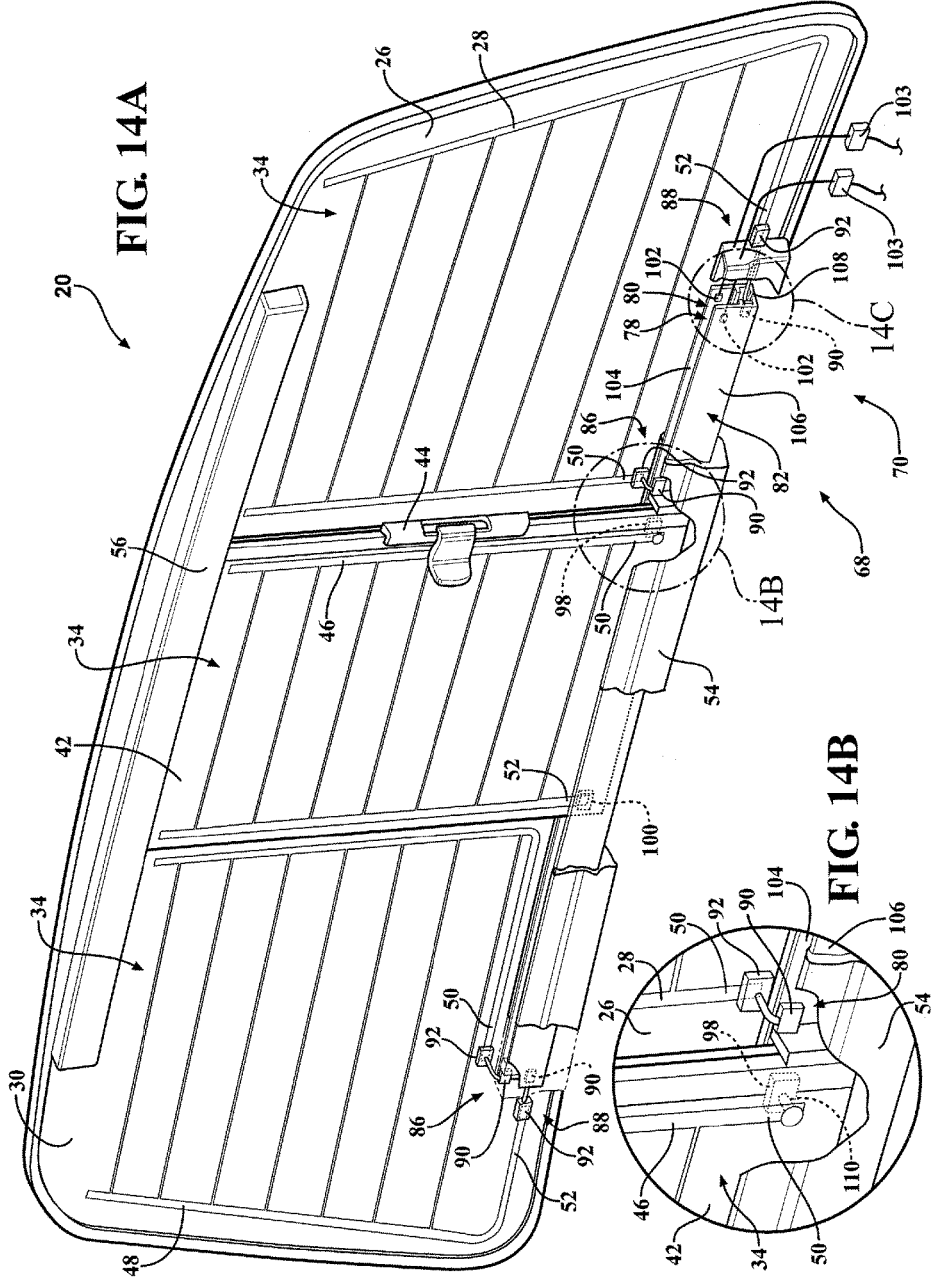

SLIDING WINDOW ASSEMBLY

CROSS REFERENCE TO RELATED APPLICATIONS

This application is a continuation-in-part of co-pending U.S. Non-Provisional patent application Ser. No. 12/906,440 filed on Oct. 18, 2010 and co-pending U.S. Non-Provisional patent application Ser. No. 12/906,444 filed on Oct. 18, 2010, the disclosures of which are hereby incorporated by reference in their entirety.

BACKGROUND OF THE INVENTION

1. Field of the Invention

The subject invention generally relates to a sliding window assembly for a vehicle.

2. Description of the Related Art

Window assemblies for vehicles are known in the art. One type of window assembly includes a first panel and a second panel each fixed to the vehicle. The first and second panels are spaced from each other to define an opening therebetween. A sliding panel is disposed between the first and second panels and is movable relative to the first and second panels between an open position and a closed position to selectively cover the opening.

The first, second, and sliding panels typically each include a heating grid for defrosting the respective panels. Further, the heating grids of the first, second, and sliding panels are electrically connected to the power source in a series circuit. In other words, electrical current flows through the heating grid of the first panel, then through the heating grid of the sliding panel, and finally through the heating grid of the second panel. Therefore, if the circuit is broken at the heating grid of the first panel, electrical current will not flow to the heating grids of the sliding panel and the second panel. For example, when the first, second, and sliding panel are electrically connected in series, and when the sliding panel moves from the closed position to the open position, the circuit is broken between the sliding panel and the second panel. As such, when the sliding panel is in the open position, electrical current will not flow through the heating grids of the sliding panel and the second panel, thus the sliding panel and the second panel will fog up or frost over which can create unsafe driving conditions. Alternatively, an occupant of the vehicle has to keep the sliding panel in the closed position to operate all of the heating grids to defrost all of the panels, which can lead to temperature discomforts or other discomforts within the vehicle cabin.

Therefore, there remains an opportunity to develop a window assembly.

SUMMARY OF THE INVENTION AND ADVANTAGES

The subject invention provides a sliding window assembly for a vehicle including a fixed panel adapted to be fixed to the vehicle. The assembly includes a first heating grid coupled to the fixed panel for defrosting the fixed panel. The assembly also includes a track coupled to the fixed panel with a sliding panel movably coupled to the track such that the sliding panel moves relative to the fixed panel between an open position and closed position. The assembly further includes a second heating grid coupled to the sliding panel for defrosting the sliding panel. The track includes a conductive element in continuous electrical connection to the first and second heating grids such that the first and second heating grids remain electrically connected to the conductive element in both of the open and closed positions of the sliding panel.

The subject invention also provides the sliding window assembly for the vehicle including a first fixed panel adapted to be fixed to the vehicle and a second fixed panel adapted to be fixed to the vehicle and spaced from the first fixed panel to define an opening therebetween. The assembly also includes a left heating grid coupled to the first fixed panel for defrosting the first fixed panel and a right heating grid coupled to the second fixed panel for defrosting the second fixed panel. The assembly further includes the track coupled to the first and second fixed panels with the track including a conductive rail in continuous electrical connection to the left and right heating grids for defrosting the first and second fixed panels.

Therefore, the sliding window assembly of the subject invention enables the first and second heating grids to remain electrically connected to the conductive element in both of the open and closed positions of the sliding panel. Hence, the fixed and sliding panels can be defogged or defrosted when the sliding panel is in both the open and closed positions; thus providing an occupant of the vehicle with safer driving conditions, as well as a more comfortable vehicle cabin. In addition, the conductive rail provides continuous electrical connection to the left and right heating grids of the first and second fixed panels which eliminates electrical wires; thus reducing costs as well as reducing assembly time.

BRIEF DESCRIPTION OF THE DRAWINGS

Advantages of the subject invention will be readily appreciated, as the same becomes better understood by reference to the following detailed description, when considered in connection with the accompanying drawings.

FIG. 9 is a partial exploded cross-sectional view of a first lower connector and a first conductive rail.

FIG. 10 is a cross-sectional view of the sliding panel with a first track and the first conductive rail disposed in the first track taken along line 10-10 of FIG. 4.

FIG. 11 is a cross-sectional view of the sliding panel with a second track and the second conductive rail disposed in the second track taken along line 11-11 of FIG. 4.

FIG. 12 is a partial cross-sectional view of the fixed panel with a first heating grid coupled to the fixed panel and a second terminal end coupled to the first heating grid.

FIG. 14A is a perspective view of an interior of the sliding window assembly of an alternative embodiment including a first conductive rail having a first conductive segment and a second conductive segment.

FIG. 14B is an enlarged view of the sliding panel taken along line 14B of FIG. 14A.

DETAILED DESCRIPTION OF THE INVENTION

Referring to the Figures, wherein like numerals indicate like or corresponding parts throughout the several views, a sliding window assembly 20 for a vehicle 22 is generally shown. Typically, the sliding window assembly 20 is coupled to a rear window body 24 of a pickup truck 22. However, it is to be appreciated that the sliding window assembly 20 can be coupled to any suitable location of other types of vehicles or non-vehicles.

Figure 1:
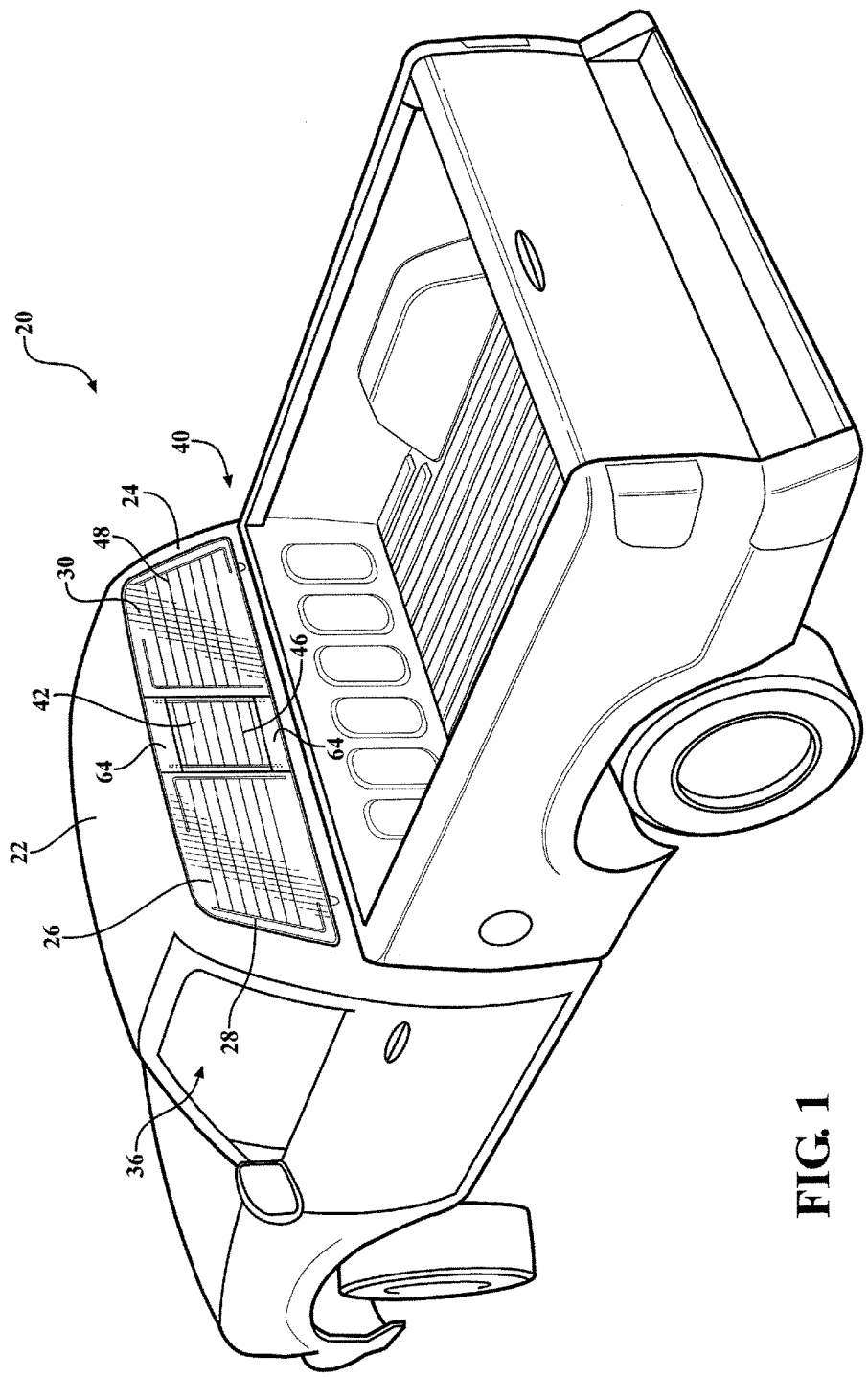
FIG. 1 is a perspective view of a sliding window assembly installed on a vehicle with a sliding panel in a closed position.
Figure 2:
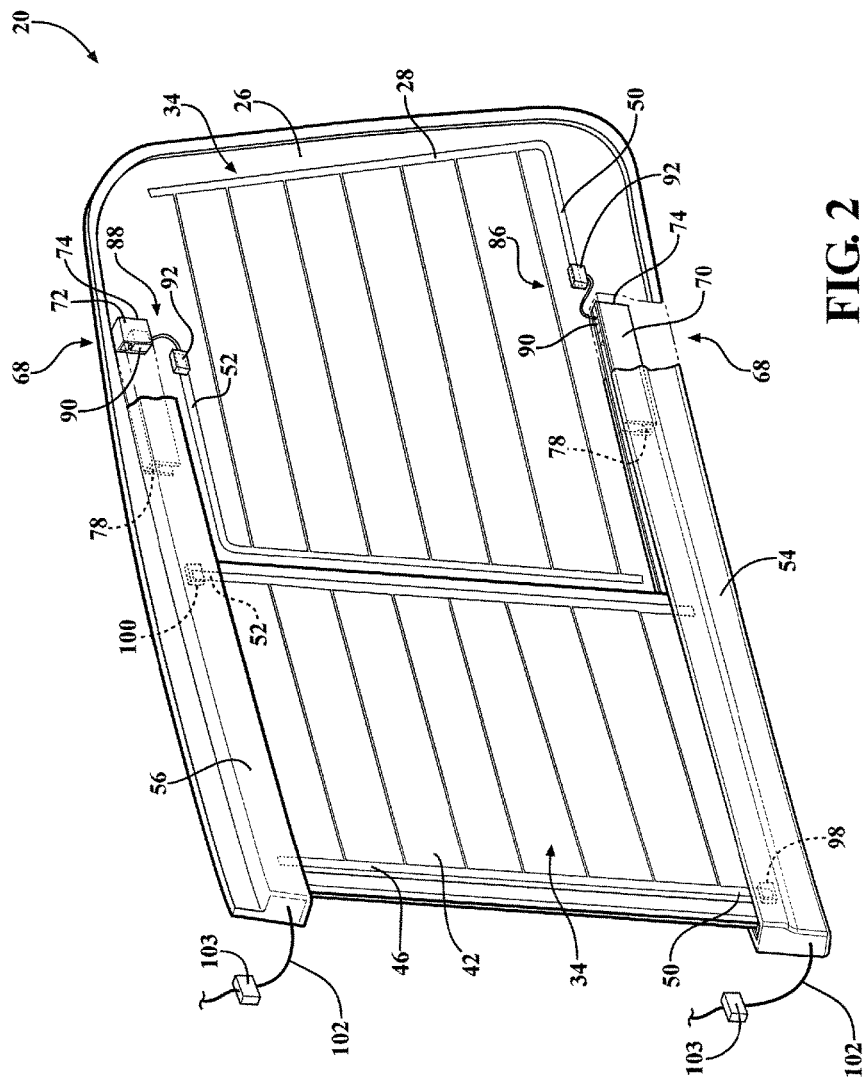
FIG. 2 is a perspective view of an interior of a sliding window assembly having a fixed panel and a sliding panel in a closed position.
Figure 3:
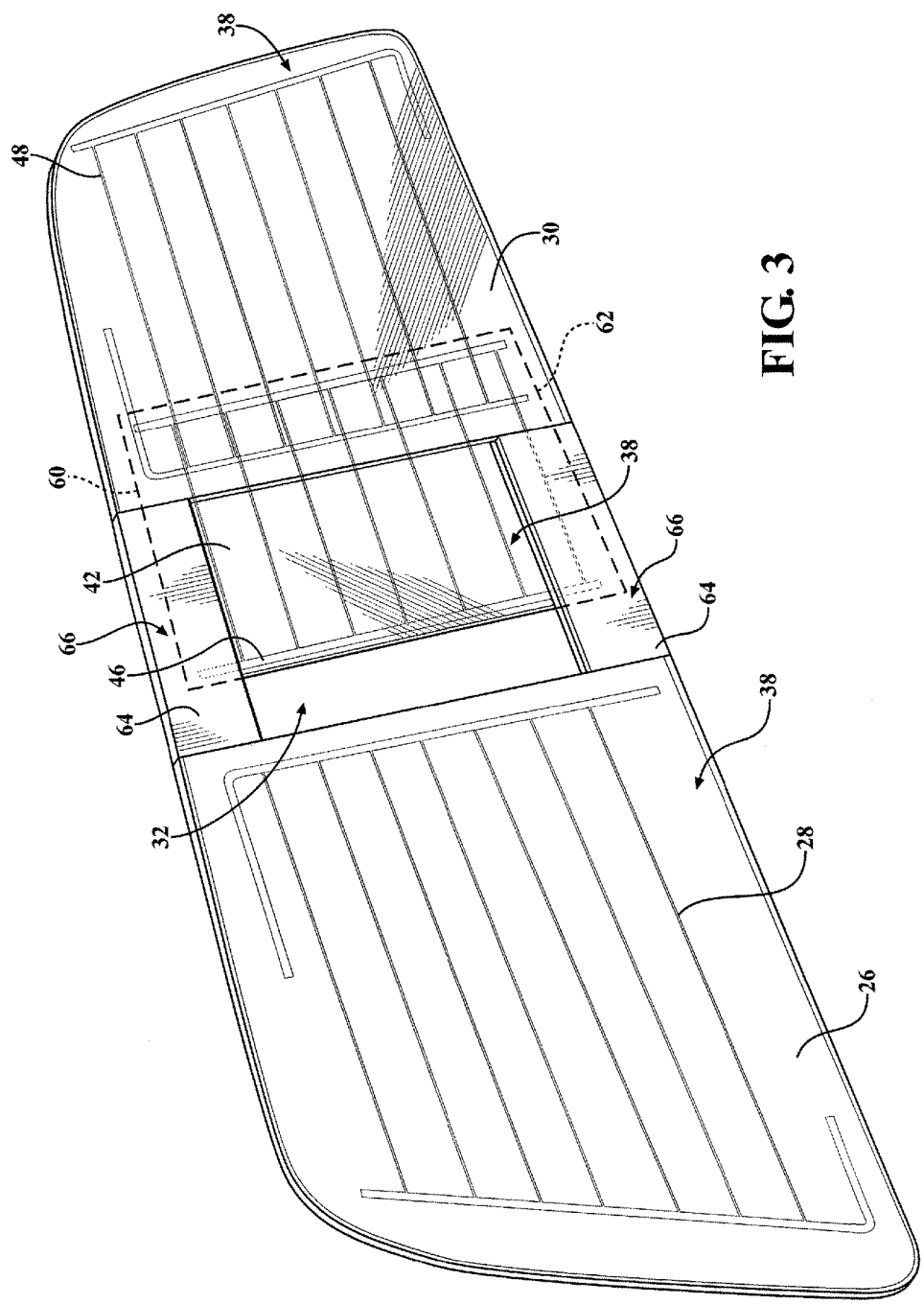
FIG. 3 is a perspective view of an exterior of another sliding window assembly having a first fixed panel and a second fixed panel spaced from each other with the sliding panel in an open position.
Figure 4:
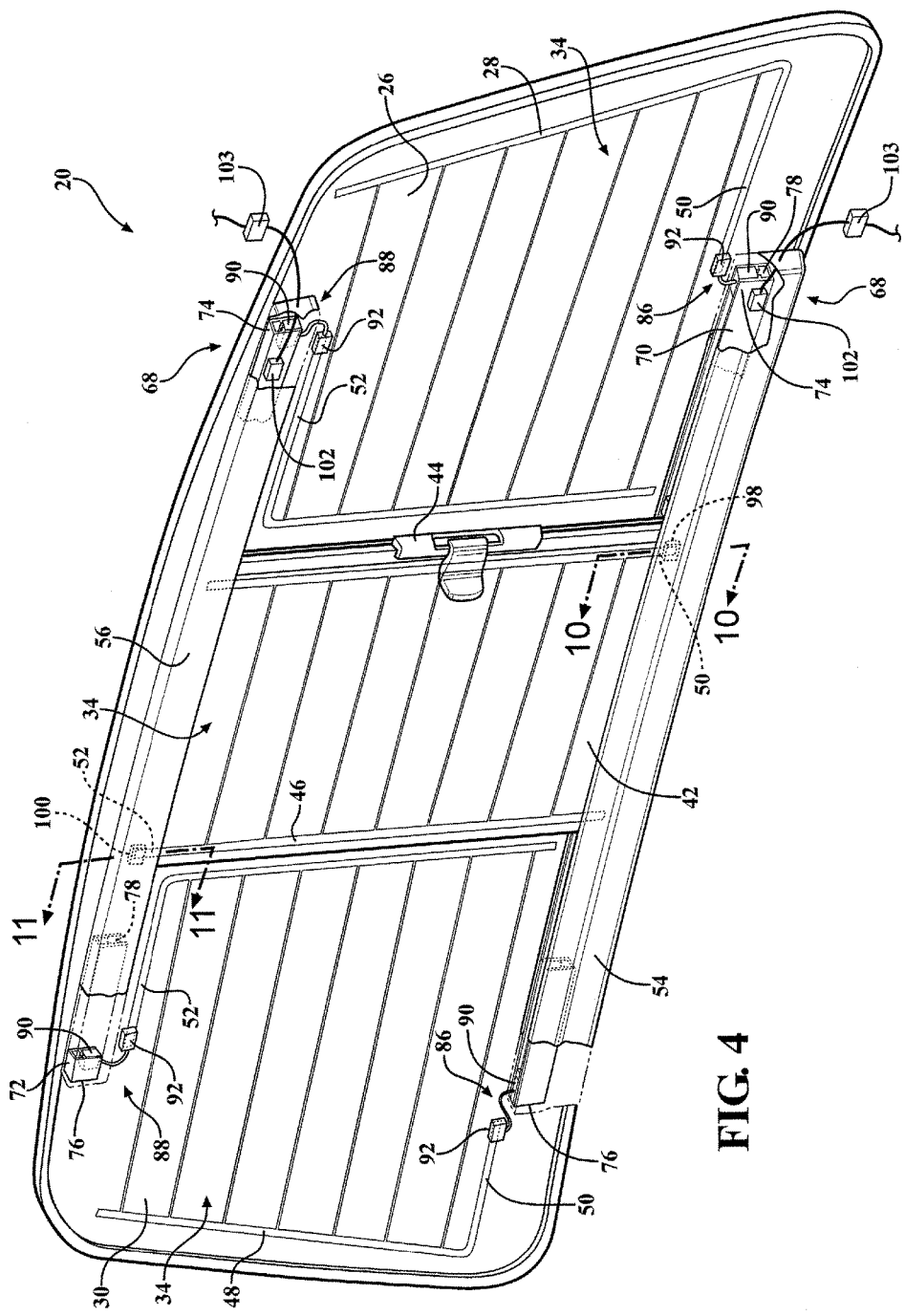
FIG. 4 is a perspective view of an interior of the sliding window assembly and the sliding panel in the closed position.
Figure 19:
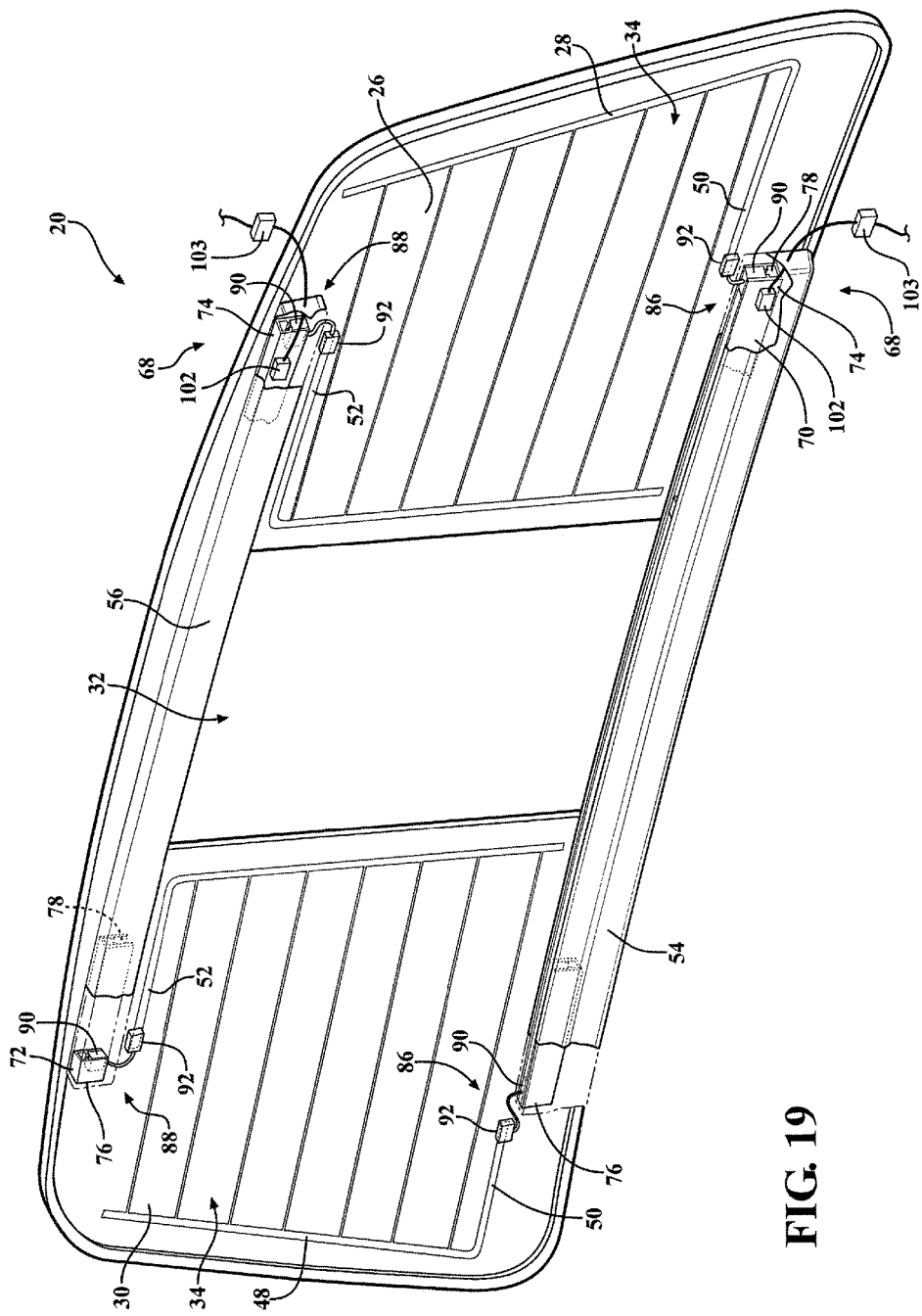
FIG. 19 is a perspective view of an interior of the sliding window assembly of yet another alternative embodiment with the first and third heating grids electrically connected in a parallel circuit.

Referring to FIGS. 1 and 2, the sliding window assembly 20 includes a fixed panel 26 adapted to be fixed to the vehicle 22 and a first heating grid or left heating grid 28 is coupled to the fixed panel 26 for defrosting the fixed panel 26. In certain embodiments, as shown in FIGS. 3, 4, and 19, the fixed panel 26 is further defined as a first fixed panel 26 and further includes a second fixed panel 30 adapted to be fixed to the vehicle 22. The first and second fixed panels 26, 30 are spaced from each other to define an opening 32 therebetween. The first and second fixed panels 26, 30 are typically formed of glass. However, it is to be appreciated that the first and second fixed panels 26, 30 can be formed from any suitable material(s) such as plastic, metal, etc.

The first and second fixed panels 26, 30 each have an interior surface 34 facing an interior 36 of the vehicle 22 when the sliding window assembly 20 is coupled to the vehicle 22. In addition, the first and second fixed panels 26, 30 each have an exterior surface 38 opposing the interior surface 34 such that the exterior surface 38 faces an exterior 40 of the vehicle 22 when the sliding window assembly 20 is coupled to the vehicle 22. The interior surface 34 is shown in FIGS. 2, 4, 5A, 5B, 6, 14A, and 15-19 and the exterior surface 38 is shown in FIGS. 1 and 3.

The sliding window assembly 20 further includes a sliding panel 42 movably coupled to the vehicle 22 such that the sliding panel 42 moves relative to the fixed panel 26 between an open position and a closed position. In certain embodiments, the sliding panel 42 moves relative to the first and second fixed panels 26, 30 between the open and closed positions. The sliding panel 42 covers the opening 32 when in the closed position as shown in FIGS. 1, 2, 4, 5A, 5B, 6, 14A, and 15-18 and the sliding panel 42 uncovers the opening 32 when in the open position as shown in FIG. 3. It is to be appreciated that the sliding panel 42 is in the open position when the sliding panel 42 is partially covering the opening 32. In other words, the sliding panel 42 is in the open position when the sliding panel 42 is completely or partially uncovering the opening 32. The sliding panel 42 is in the closed position when the sliding panel 42 completely covers the opening 32. The sliding panel 42 typically moves horizontally relative to the first and/or second fixed panels 26, 30. It is to be appreciated that the sliding panel 42 can move in any other suitable direction, such as, for example, vertically.

The sliding panel 42 is movable between the open and closed positions either manually or automatically (e.g. by a cable and motor power system). For example, as shown in FIGS. 4, 14A, 15, and 16, a latch 44 can be attached to the sliding panel 42 to manually move the sliding panel 42 between the open and closed positions. As another example, as shown in FIGS. 2, 5A, 5B, 6, 17, and 18, the latch 44 can be eliminated when the sliding panel 42 moves automatically by the cable and motor power system. Referring to FIGS. 5A, 5B, 6, 17 and 18, one example of the cable and motor power system is illustrated having a motor 43 and a cable 45 coupled to the motor 43 and the sliding panel 42 for moving the sliding panel 42 relative to the first and second fixed panels 26, 30 between the open position uncovering the opening 32 and the closed position covering the opening 32, as further disclosed in U.S. patent application Ser. No. 12/944,444 filed concurrently with the subject application, the disclosure of which is incorporated by reference in its entirety.

The sliding panel 42 also has an interior surface 34 facing the interior 36 of the vehicle 22 when the sliding window assembly 20 is coupled to the vehicle 22. Further, the sliding panel 42 has the exterior surface 38 opposing the interior surface 34 such that the exterior surface 38 faces the exterior 40 of the vehicle 22 when the sliding window assembly 20 is coupled to the vehicle 22. As such, the interior surface 34 of each of the panels 26, 30, 42 face the interior 36 of the vehicle 22 and the exterior surface 38 of each of the panels 26, 30, 42 face the exterior 40 of the vehicle 22.

Turning to FIGS. 2 and 4, a second heating grid or center heating grid 46 is coupled to the sliding panel 42 for defrosting the sliding panel 42. In certain embodiments, as shown in FIGS. 5A, 5B, 6, 17 and 18, a conductive core 47 is electrically connected to the second heating grid 46 and coupled with the cable 45 such that the conductive core 47 moves concurrently with the cable 45 as the cable 45 moves the sliding panel 42 between the open and closed positions. For a further discussion of the conductive core 47, see U.S. patent application Ser. No. 12/944,444 filed concurrently with the subject application, in which the conductive core 47 is referred to as a conductive element therein.

As best shown in FIGS. 4, 5A, 5B, 6, 14A, and 15-19, a third heating grid or right heating grid 48 is coupled to the second fixed panel 30 for defrosting the second fixed panel 30. The first, second, and third heating grids 28, 46, 48 are typically coupled on the same side of the respective panels 26, 30, 42. More typically, the first, second, and third heating grids 28, 46, 48 are coupled to the interior surface 34 of the respective panels 26, 30, 42. It is to be appreciated that the first, second, and third heating grids 28, 46, 48 can be coupled to the exterior surface 38 of the respective panels 26, 30, 42 or any other suitable location.

The first, second, and third heating grids 28, 46, 48 are typically formed of a paste for allowing electrical current to flow through the heating grids 28, 46, 48, which is discussed further below. The paste can be formed of silver, ceramic, and/or any other suitable material(s). For example, the first, second, and/or third heating grids 28, 46, 48 can be formed of silver frit for tempered glass or laminated glass. As another example, the first, second, and/or third heating grids 28, 46, 48 can be formed of wires(s) for laminated glass. The paste of the first, second, and third heating grids 28, 46, 48 are typically bonded to the respective panels 26, 30, 42. The first, second, and/or third heating grids 28, 46, 48 can also be formed by screen printing, wire(s) impregnated in polyvinyl butyral (PVB), and/or any other suitable method.

Each of the first, second, and third heating grids 28, 46, 48 include a first end 50 and a second end 52 spaced from the first end 50 of respective first, second, and third heating grids 28, 46, 48. The first and second ends 50, 52 of each of the first, second, and third heating grids 28, 46, 48 are typically disposed on the same side in a spaced relationship. In other words, the first and second ends 50, 52 of each of the first, second, and third heating grids 28, 46, 48 are disposed on the interior surface 34 of the respective panels 26, 30, 42. It is to be appreciated that the first and second ends 50, 52 of the first, second, and third heating grids 28, 46, 48 can be disposed on the exterior surface 38 of the respective panels 26, 30, 42 or any other suitable location. As suggested above, the first heating grid 28 is also referred to as the left heating grid 28, the second heating grid 46 is also referred to as the center heating grid 46, and the third heating grid 48 is also referred to as the right heating grid 48 in this specification.

Referring back to FIG. 2, the sliding window assembly 20 also includes a track 54 coupled to the fixed panel 26 with the sliding panel 42 movably coupled to the track 54. In certain embodiments, as shown in FIGS. 4, 5A, 5B, 6, 14A and 15-19, the track 54 is coupled to the first and second fixed panels 26, 30. In yet another embodiment, the track 54 is further defined as a first track 54 and further includes a second track 56 coupled to the first and second fixed panels 26, 30 above the first track 54 with the sliding panel 42 movably coupled to the first and second tracks 54, 56. More specifically, as shown in FIGS. 9-11, the first and second tracks 54, 56 each define a slot 58 facing each other for receiving and/or guiding the sliding panel 42. Even more specifically, the sliding panel 42 includes a top edge 60 and a bottom edge 62 spaced from each other with the bottom edge 62 disposed in the slot 58 of the first track 54 and the top edge 60 disposed in the slot 58 of the second track 56.

Typically, the first and second tracks 54, 56 are disposed horizontally in a substantially spaced and parallel relationship such that the sliding panel 42 moves horizontally back and forth relative to the first and second fixed panels 26, 30. It is to be appreciated that the first and second tracks 54, 56 can be positioned in any other suitable orientation or location, such as, for example, vertically spaced such that the sliding panel 42 can move vertically up and down relative to the first and second fixed panels 26, 30.

The first and second tracks 54, 56 are typically coupled to the first and second fixed panels 26, 30 by any suitable method, such as for example, encapsulation, molding, bonding, etc. Generally, encapsulation results in an encapsulant that can be used to couple the first and second tracks 54, 56 to the first and second fixed panels 26, 30. In addition, encapsulation can be further defined as single-sided encapsulation, two-sided encapsulation, or three-sided encapsulation. For example, with single-sided encapsulation, the first and second tracks 54, 56 are coupled to the interior surface 34 of the first and second fixed panels 26, 30 leaving the exterior surface 38 of the first and second fixed panels 26, 30 free of the encapsulant. When encapsulation is employed, the first and second tracks 54, 56 are formed, at least partially, from the encapsulant. More specifically, with respect to encapsulation, the first and second tracks 54, 56 are formed of the encapsulant and are coupled to the first and second fixed panels 26, 30 by encapsulation. It is to be appreciated that any type of encapsulation or adhesive surface bonding can be utilized for coupling the first and second tracks 54, 56 to the first and second fixed panels 26, 30.

When utilizing encapsulation, the encapsulant is typically formed of a plastic material(s) and more typically, thermoplastic material(s) and/or thermoset material(s). Even more typically, the plastic material is polyvinyl chloride (PVC). It is to be appreciated that the encapsulant can be formed from various plastic material(s), such as, for example, thermoplastic elastomers (TPE); elastomeric alloys, e.g. thermoplastic vulcanizates (TPV); thermoplastic polyolefins (TPO); thermoplastic styrene (TPS); polyurethane; and various different types of reaction injection molding (RIM) materials; and/or any other suitable material(s) for encapsulation. One example of a suitable polyurethane is commercially available from BASF Corporation under the tradename of COLO-FAST™, e.g. COLO-FAST™ LM-161.

In one embodiment, as shown in FIGS. 1 and 3, appliqué 64 is attached to the track 54. More specifically, one piece of appliqué 64 is attached to the first track 54 and another piece of appliqué 64 is attached to the second track 56. It is to be appreciated that the appliqué 64 can be attached to the first and/or second tracks 54, 56 and/or the encapsulant. Typically, the appliqué 64 is disposed in the opening 32 between the first and second fixed panels 26, 30 along the first and second tracks 54, 56. The appliqué 64 includes an external surface 66 aligning with the exterior surface 38 of first and second fixed panels 26, 30 such that the exterior and external surfaces 38, 66 are substantially flush relative each other. The appliqué 64 is typically formed of a plastic material, such as, for example, a polycarbonate plastic. It is to be appreciated that other plastic material(s), glass, metal, and/or any other suitable material(s) can be utilized for the appliqué 64. In the configuration where the encapsulant is the first and second tracks 54, 56, the appliqué 64 is typically attached to the first and second tracks 54, 56 by encapsulation. It is to be appreciated that the appliqué 64 can be attached to the first and second tracks 54, 56 by any suitable method, such as, for example, adhesive.

Turning to FIGS. 2, 4, and 9, the track 54 includes a conductive element 68 in continuous electrical connection to the first and second heating grids 28, 46 such that the first and second heating grids 28, 46 remain electrically connected to the conductive element 68 in both of the open and closed positions of the sliding panel 42. Typically, the conductive element 68 is disposed in the slot 58 of the track 54. The conductive element 68 defines a generally u-shaped configuration or any other suitable configuration or orientation. It is to be appreciated that any of the cable 45, the conductive core 47, and the motor 43 embodiments/alternatives as disclosed in U.S. patent application Ser. No. 12/944,444 filed concurrently with the subject application, can be utilized with the conductive element 68 etc., as disclosed herein.

The first and second heating grids 28, 46 are in continuous electrical connection to the conductive element 68 in a parallel circuit. More typically, the third heating grid 48 is also in continuous electrical connection to the conductive element 68 such that the first, second, and third heating grids 28, 46, 48 remain electrically connected to the conductive element 68 in both of the open and closed positions of the sliding panel 42. In one embodiment, the first, second, and third heating grids 28, 46, 48 are in continuous electrical connection to the conductive element 68 in the parallel circuit. It is to be appreciated that the first, second, and/or third heating grids 28, 46, 48 can be electrically connected to the conductive element 68 in any other suitable configuration or orientation, such as, for example series circuit, etc.

Figure 5A:
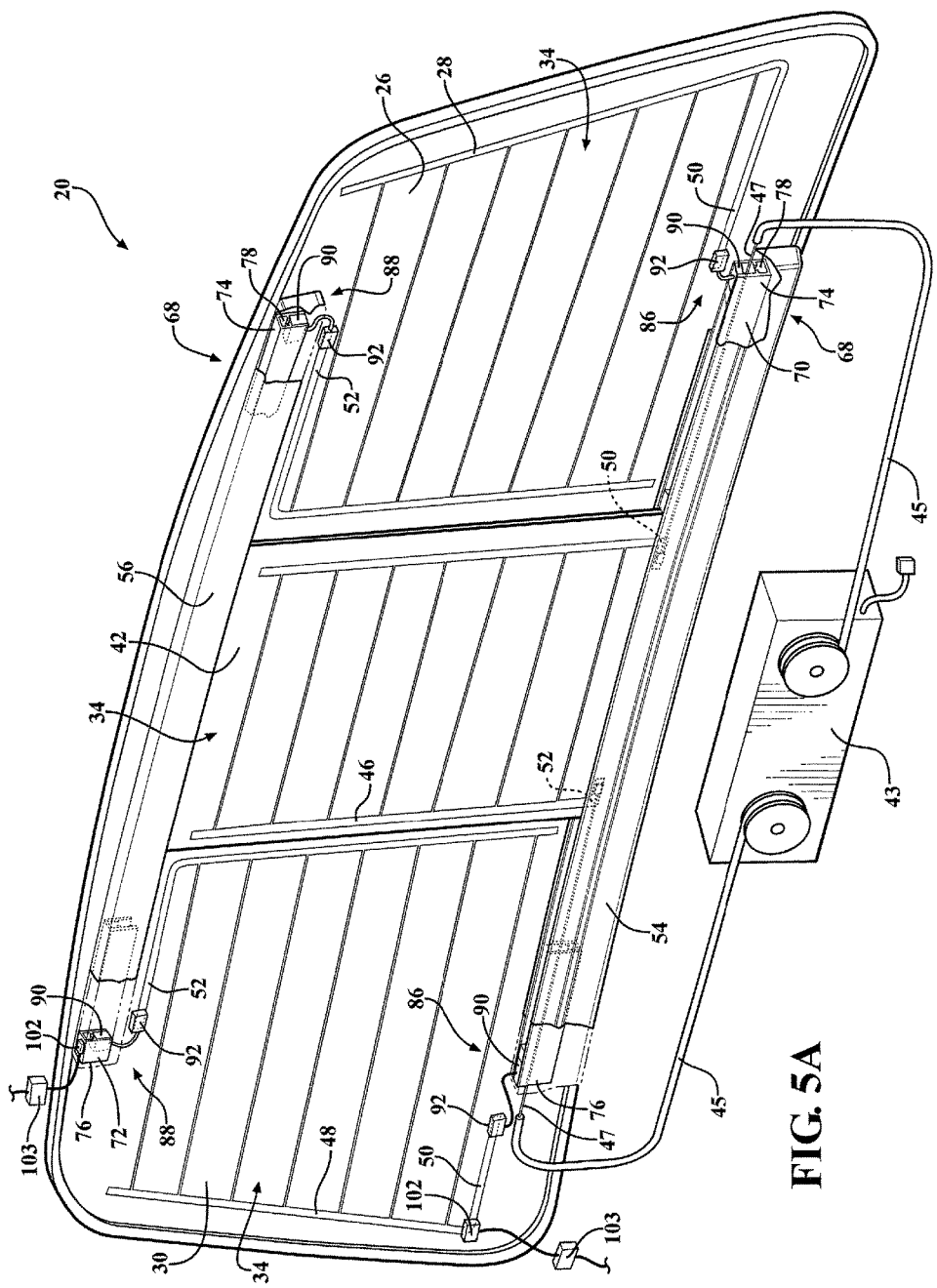
FIG. 5A is a perspective view of the interior of another sliding window assembly with a cable coupled to the sliding panel and one connector coupled to a first end of a third heating grid and another connector coupled to a second conductive rail.
Figure 5B:
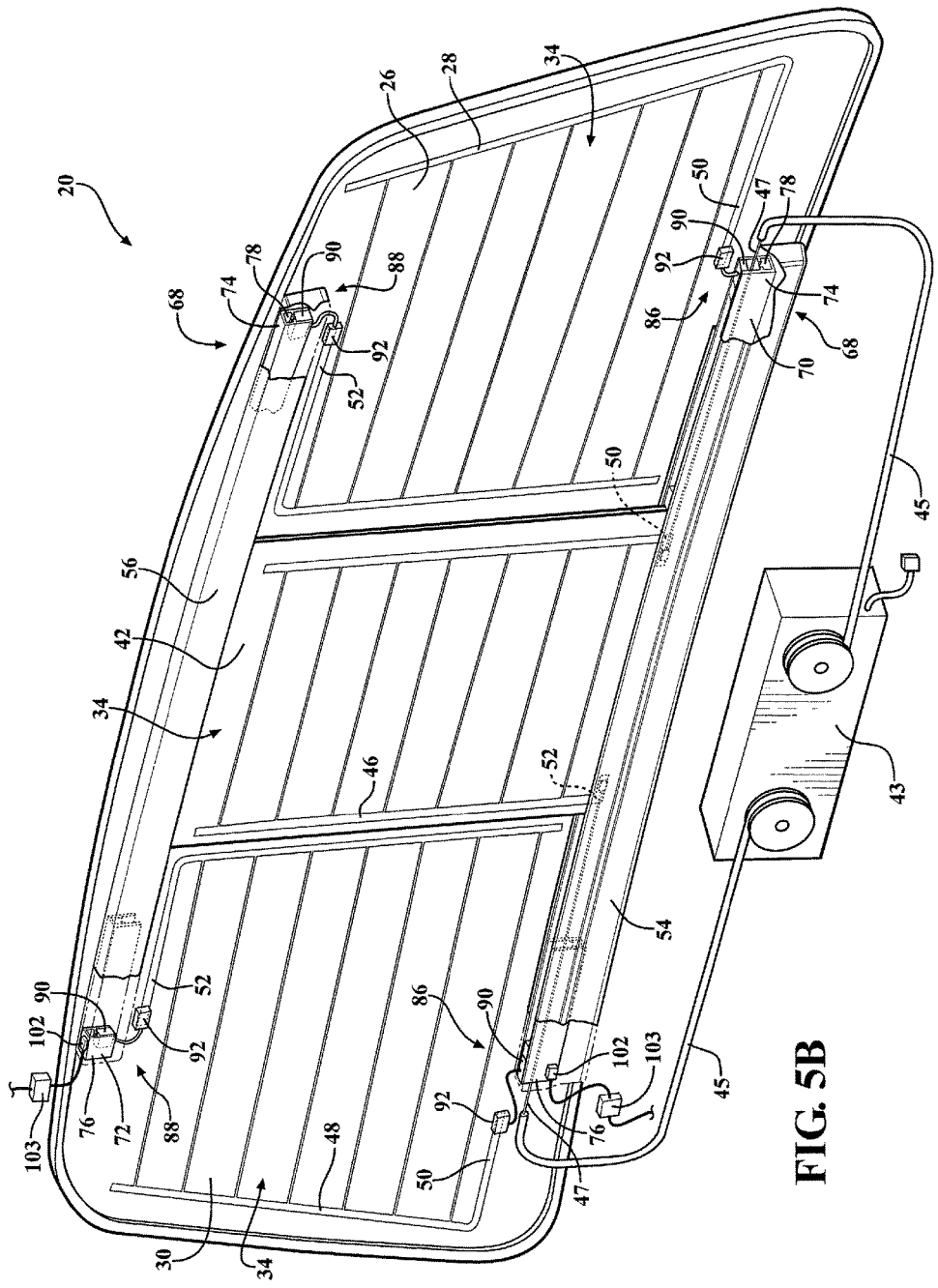
FIG. 5B is a perspective view of the interior of the sliding window assembly with the cable coupled to the sliding panel and one connector coupled to a first conductive rail and another connector coupled to the second conductive rail.
Figure 6:
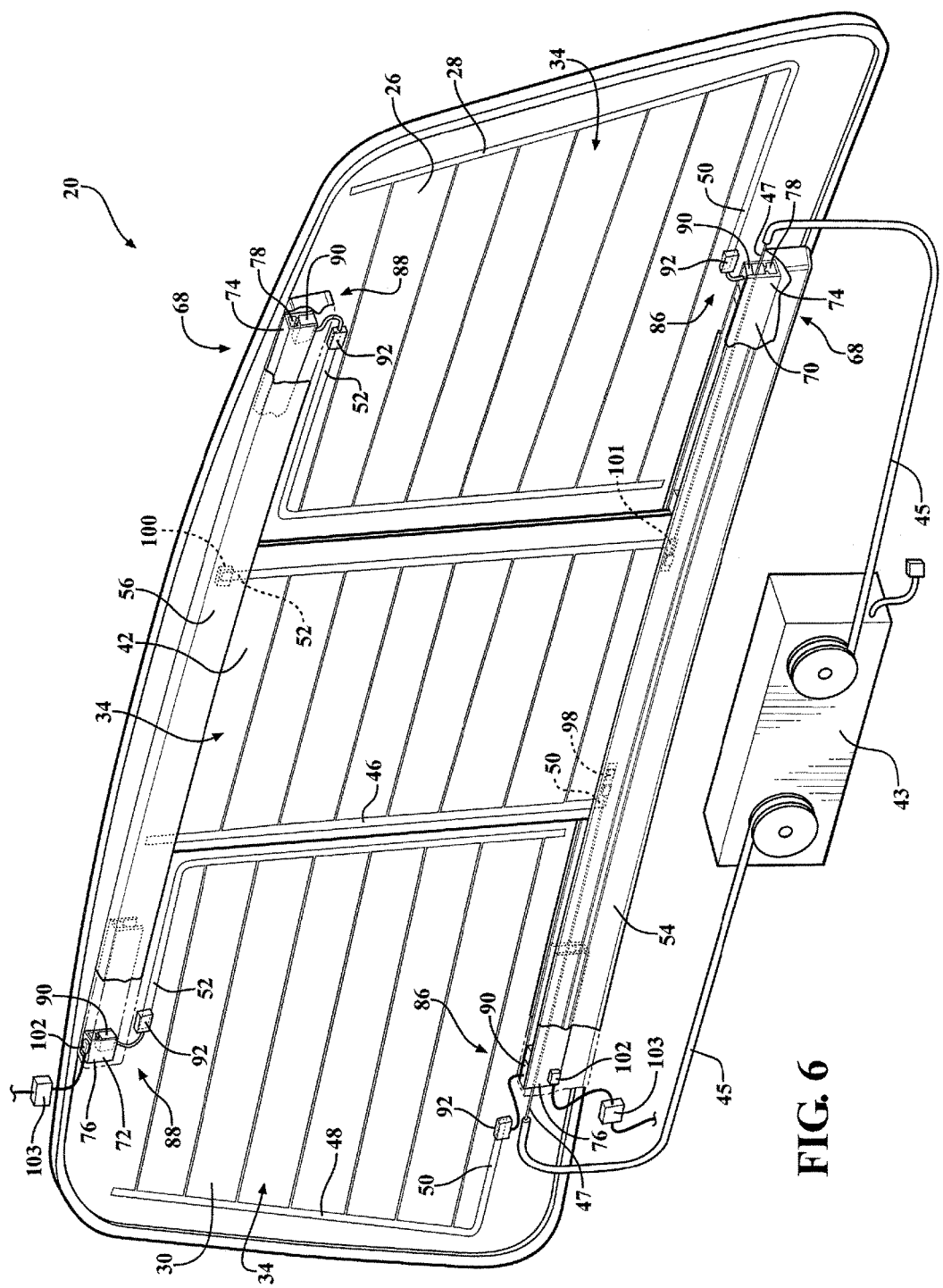
FIG. 6 is a perspective view of the interior of the sliding window assembly with the cable, a second upper connector, and a second lower connector coupled to the sliding panel.

In one embodiment, as shown in FIGS. 4, 5A, 5B, 6, and 19, the track 54 includes a conductive rail 68 in continuous electrical connection to the first and third heating grids 28, 48 for defrosting the first and second fixed panels 26, 30. More specifically, the first and third heating grids 28, 48 are in continuous electrical connection to the conductive rail 68 in a parallel circuit. As such, the first and third heating grids 28, 48 remain electrically connected to the conductive rail 68 in both the open and closed positions of the sliding panel 42. In another embodiment, as shown in FIGS. 4 and 6, the track 54 includes the conductive rail 68 in continuous electrical connection to the first, second, and third heating grids 28, 46, 48 such that the first, second, and third heating grids 28, 46, 48 remain electrically connected to the conductive rail 68 in both of the open and closed positions. Typically, the conductive element 68 is further defined as the conductive rail 68. More typically, the conductive element 68 is further defined as a first conductive rail 70 coupled to the track 54 and receiving the sliding panel 42. In other words, the first conductive rail 70 is coupled to one of the first and second tracks 54, 56.

In certain embodiments, as shown in FIGS. 2, 4, 5A, 5B, and 6, the conductive element 68 further includes a second conductive rail 72 spaced from the first conductive rail 70 with the second conductive rail 72 receiving the sliding panel 42. In other words, each of the first and second conductive rails 70, 72 receive the sliding panel 42. Typically, the first conductive rail 70 is coupled to the first track 54 and the second conductive rail 72 is coupled to the second track 56. More typically, the first conductive rail 70 is disposed in the slot 58 of the first track 54 and the second conductive rail 72 is disposed in the slot 58 of the second track 56. Hence, when the first and second tracks 54, 56 are spaced horizontally from each other, the first and second conductive rails 70, 72 are correspondingly spaced horizontally from each other and when the first and second tracks 54, 56 are spaced vertically from each other, the first and second conductive rails 70, 72 are correspondingly spaced vertically from each other. It is to be appreciated that various mechanical and electrical components can be re-orientated or relocated to accommodate vertical tracks 54, 56 and vertical rails 70, 72 for vertical movement of the sliding panel 42.

In one alternative, as shown in FIGS. 2, 4, 5A, 5B, 6, and 19, the first heating grid 28 is in continuous electrical connection to the first and second conductive rails 70, 72. In another alternative, as shown in FIGS. 2, 4, and 6, the first and second heating grids 28, 46 are in continuous electrical connection to the first and second conductive rails 70, 72. In yet another alternative, as shown in FIGS. 5A, 5B, and 6, the first and third heating grids 28, 48 are in continuous electrical connection to the first and second conductive rails 70, 72 with the second heating grid 46 electrically connected to the conductive core 47. In other words, the first and third heating grids 28, 48 are electrically connected to the first and second conductive rails 70, 72 and the second heating grid 46 is electrically connected to the conductive core 47 independently of the first and second conductive rails 70, 72. As such, independently of the first and second conductive rails 70, 72, the second heating grid 46 is electrically connected to the conductive core 47. In yet another alternative, as shown in FIGS. 4 and 6, the first, second, and third heating grids 28, 46, 48 is in continuous electrical connection to the first and second conductive rails 70, 72 such that the first, second, and third heating grids 28, 46, 48 remain electrically connected to the first and second conductive rails 70, 72 in both of the open and closed positions of the sliding panel 42. More specifically, the first, second, and third heating grids 28, 46, 48 are in continuous electrical connection to the first and second conductive rails 70, 72 in the parallel circuit.

It is to be appreciated that the first, second, and third heating grids 28, 46, 48 can be in continuous electrical connection in the parallel circuit without utilizing the first and/or second conductive rails 70, 72, such as, for example, electrical wires can be coupled to each of the heating grids 28, 46, 48 in the parallel circuit. It is to also be appreciated that other configurations or orientations of the first and second conductive rails 70, 72 can be utilized to create the parallel circuit, such as, for example, a plurality of first conductive rails 70 spaced from each other and each electrically connected to the first end 50 of respective heating grids 28, 46, 48 and a plurality of second conductive rails 72 each spaced from each other and each electrically connected to the second end 52 of respective heating grids 28, 46, 48. It is to further be appreciated that the first, second, and third heating grids 28, 46, 48 can be in continuous electrical connection in the parallel circuit without utilizing the first and second conductive rails 70, 72, such as, for example, electrical wires can be coupled to each of the heating grids 28, 46, 48 in the parallel circuit.

The first and second conductive rails 70, 72 each include a first rail end 74 and a second rail end 76 spaced from each other. In other words, the first and second conductive rails 70, 72 extend between respective first and second rail ends 74, 76 such that the first and second conductive rails 70, 72 are elongated. It is to be appreciated that the first heating grid 28 of the first fixed panel 24 can be energized by the conductive element 68 while separately the third heating grid 48 of the second fixed panel 30 can be energized by another conductive element 68. For example, the first heating grid 28 of the first fixed panel 24 can be energized by the first and second conductive rails 70, 72 while separately the third heating grid 48 of the second fixed panel 30 can be energized by another first and second conductive rails 70, 72. It is to further be appreciated that the second heating grid 46 of the sliding panel 42 can be energized by yet another conductive element 68, or the first and second conductive rails 70, 72 separately from the first and/or third heating grids 28, 48.

Each of the first and second conductive rails 70, 72 defines a channel 78 between the first and second rail ends 50, 76 for receiving and/or guiding the sliding panel 42. More specifically, the first and second conductive rails 70, 72 are each defined as a generally u-shaped configuration or any other suitable configuration. The channel 78 of each of the first and second conductive rails 70, 72 presents an inner surface 80 and an outer surface 82 opposing the inner surface 80.

Typically, the first and second conductive rails 70, 72 are formed of a metal material(s). More typically, the metal material of the first and second conductive rails 70, 72 is an alloy. Suitable alloys include aluminum and/or iron alloys, e.g. steel. It is to be appreciated that the first and second conductive rails 70, 72 can be formed of polymeric material(s), such as plastic material(s) with strips, etc. of conductive material therein; coated with any suitable material(s); and/or any other suitable material(s). For example, the first and second rails 70, 72 can be anodized and/or e-coated aluminum.

The first and second conductive rails 70, 72 can also be coupled to the first and/or second tracks 54, 56 during encapsulation such that the encapsulant at least partially encompasses the outer surface 82 of the first and second conductive rails 70, 72. In such an embodiment, the first and second tracks 54, 56 are each integral with the first and second fixed panels 26, 30. Specifically, the first track 54 is integral with the first conductive rail 70 and the first and second fixed panels 26, 30. Likewise, the second track 56 is integral with the second conductive rail 72 and the first and second fixed panels 26, 30. In other words, the first and second tracks 54, 56 the first and second fixed panels 26, 30 form a single continuous unit.

As shown in FIGS. 9-11 and 13, optionally, an insert 84 can be disposed in each channel 78 of the first and second conductive rails 70, 72. More specifically, the insert 84 engages the inner surface 80 of the channel 78 of each of the first and second conductive rails 70, 72. Typically, the bottom edge 62 of the sliding panel 42 slidably engages the insert 84 of the first conductive rail 70 for reducing a coefficient of friction between the sliding panel 42 and the first conductive rail 70; thus reducing the work required to move the sliding panel 42 between the open and closed positions. It is to be appreciated that the top edge 60 of the sliding panel 42 can be spaced from or engage the insert 84 of the second conductive rail 72. FIG. 10 illustrates the bottom edge 62 of the sliding panel 42 engaging the insert 84 and FIG. 11 illustrates the top edge 60 of the sliding panel 42 being spaced from the insert 84.

Figure 7:
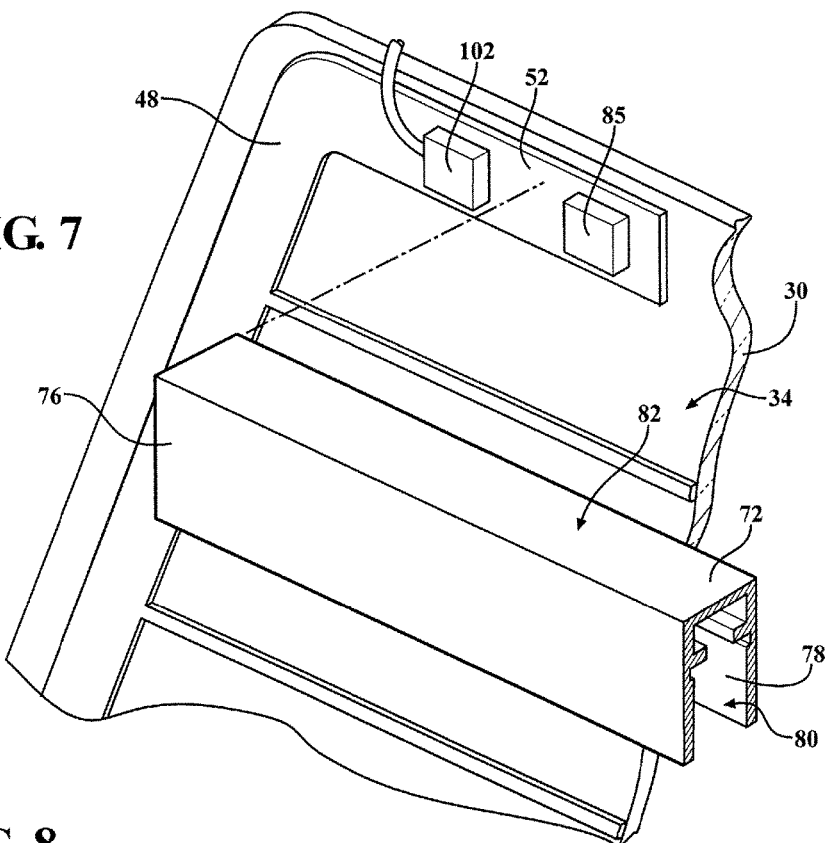
FIG. 7 is a broken-partial exploded perspective view of the second fixed panel and the second conductive rail.
Figure 8:
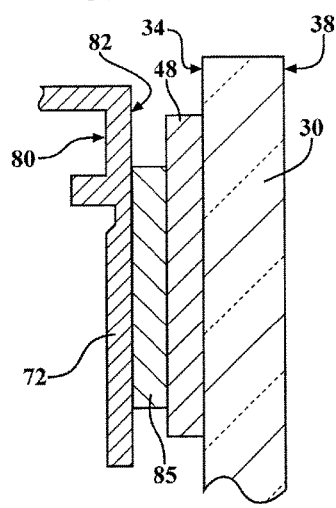
FIG. 8 is a broken cross-sectional view of the second fixed panel, the third heating grid, a contact, and the second conductive rail.
Figure 14C:
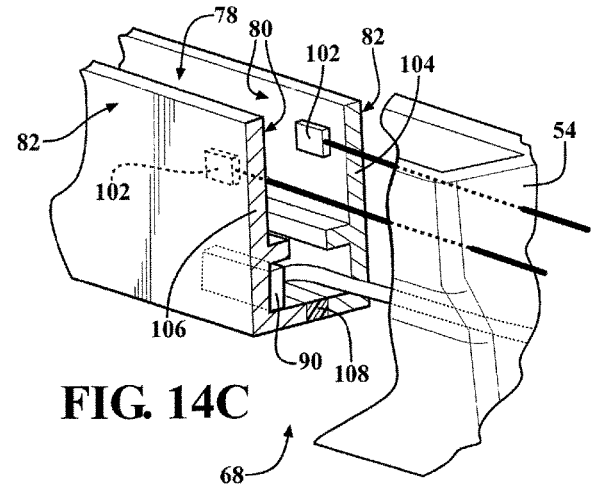
FIG. 14C is an enlarged view of the first conductive rail and the first track taken along line 14C of FIG. 14A.

In certain embodiments, the first and second conductive rails 70, 72 are coupled to the first and second fixed panels 26, 30 as shown in FIGS. 7 and 8. A contact 85 is coupled to respective first and third heating grids 28, 48 of the first and second fixed panels 26, 30. Each contact 85 is disposed between respective first and second conductive rails 70, 72 and respective first and third heating grids 28, 48 for electrically connecting the first and third heating grids 28, 48 to the first and second conductive rails 70, 72. As shown in FIG. 8, one contact 85 is disposed or sandwiched between the third heating grid 48 and the second conductive rail 72. Even though only one contact 85 is illustrated, another contact 85 is disposed or sandwiched between the first heating grid 28 and the second conductive rail 72. Likewise, one contact 85 can be disposed or sandwiched between the first heating grid 28 and the first conductive rail 70 and another contact 85 can be disposed or sandwiched between the third heating grid 48 and the first conductive rail 70. Hence, the contacts 85 abut the first and second conductive rails 70, 72 and more specifically, abut the outer surface 82 of the first and second conductive rails 70, 72. It is to be appreciated that one contact 85 can be coupled to each of the first and second ends 50, 52 of each of the first and third heating grids 28, 48 when utilizing the first and second conductive rails 70, 72 embodiments. It is to be appreciated that additional contacts 85 can be utilized for providing additional electrical connections. It is also to be appreciated that less contacts 85 can be utilized when utilizing only one of the first and second conductive rails 70, 72 embodiments discussed below. Further, it is to be appreciated that the contacts 85 can be any suitable configuration and can be coupled to the first and second heating grids 28, 48 at any suitable location. For this configuration, typically, the first and second tracks 54, 56 encapsulate the first and second conductive rails 70, 72 and the contacts 85. It is to be appreciated that the first and second conductive rails 70, 72 and the contacts 85 can be coupled to each other by soldering, welding, adhesive, bonding, and/or any other suitable method.

Referring to FIGS. 4, 5A, 5B, 6, and 19, in certain embodiments, the sliding window assembly 20 further includes a plurality of first lower connectors 86 each coupled to the first conductive rail 70 and a plurality of first upper connectors 88 each coupled to the second conductive rail 72 for electrically connecting the first and second conductive rails 70, 72 to the first and third heating grids 28, 48. Typically, the first lower connectors 86 are each coupled to the first conductive rail 70 and respective first and third heating grids 28, 48. Similarly, the first upper connectors 88 are each coupled to the second conductive rail 72 and respective first and third heating grids 28, 48. It is to be appreciated that the first lower and upper connectors 86, 88 can be coupled to the first and second conductive rails 70, 72 respectively at any suitable location. Likewise, it is to be appreciated that the first lower and upper connectors 86, 88 can be coupled to the first and third heating grids 28, 48 at any suitable location.

The first lower and upper connectors 86, 88 each include a first terminal end 90 and a second terminal end 92 spaced from each other. The first terminal end 90 of each of the first lower connectors 86 are coupled to the first conductive rail 70. More specifically, the first terminal end 90 of each of the first lower connectors 86 engages the inner surface 80 of the channel 78 of the first conductive rail 70. Further, the second terminal end 92 of each of the first lower connectors 86 are coupled to respective first and third heating grids 28, 48. Typically, the second terminal end 92 of one of the first lower connectors 86 is coupled to the first end 50 of the first heating grid 28 and the second terminal end 92 of another one of the first lower connectors 86 is coupled to the first end 50 of the third heating grid 48. FIG. 12 illustrates the second terminal end 92 of one of the first lower connectors 86 engaging the first end 50 of the first heating grid 28. Typically, the first terminal end 90 of one of the first lower connectors 86 is disposed adjacent the first rail end 74 of the first conductive rail 70 and the first terminal end 90 of another one of the first lower connectors 86 is disposed adjacent the second rail end 76 of the first conductive rail 70. Likewise, the first terminal end 90 of one of the first upper connectors 88 is disposed adjacent the first rail end 74 of the second conductive rail 72 and the first terminal end 90 of another one of the first upper connectors 88 is disposed adjacent the second rail end 76 of the second conductive rail 72. Typically, the second terminal end 92 of the first lower and upper connectors 86, 88 are soldered to the first and third heating grids 28, 48 respectively. It is to be appreciated that the first lower and upper connectors 86, 88 can be secured to the first and third heating grids 28, 48 by any other suitable method such as, for example, welding, adhesive, bonding, etc.

Additionally, the first terminal end 90 of each of the first upper connectors 88 are coupled to the second conductive rail 72. More specifically, the first terminal end 90 of each of the first upper connectors 88 engages the inner surface 80 of the channel 78 of the second conductive rail 72. Further, the second terminal end 92 of each of the first upper connectors 88 are coupled to respective first and third heating grids 28, 48. Typically, the second terminal end 92 of one of the first upper connectors 88 is coupled to the second end 52 of the first heating grid 28 and the second terminal end 92 of another one of the first upper connectors 88 is coupled to the second end 52 of the third heating grid 48.

Figure 13:
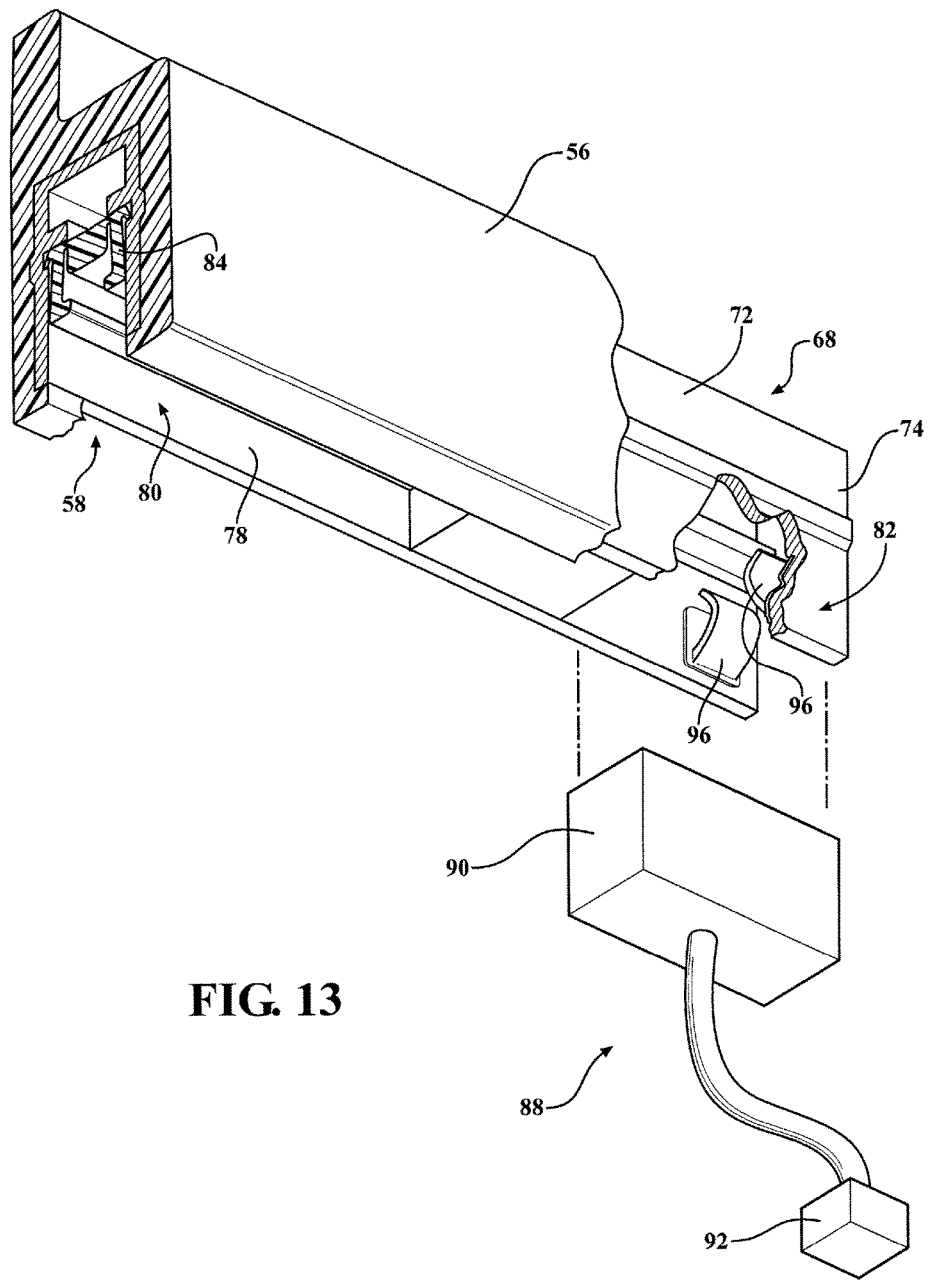
FIG. 13 is a partial exploded cross-sectional view of a first upper connector and the second conductive rail.

In certain embodiments, one of the first conductive rail 70 and the first lower connectors 86 include a plurality of first retainers 94 spaced from each other for securing the first terminal end 90 of the first lower connectors 86 to the first conductive rail 70. As shown in FIG. 9, the first conductive rail 70 includes the first retainers 94. Also, in certain embodiments, one of the second conductive rail 72 and the first upper connectors 88 include a plurality of second retainers 96 spaced from each other for securing the first terminal end 90 of the first upper connectors 88 to the second conductive rail 72. As shown in FIG. 13, the second conductive rail 72 includes the second retainers 96. Typically, the first and second retainers 94, 96 are each further defined as a biasing member, such as, for example, a spring. The first and second retainers 94, 96 secure the first terminal end 90 of the first lower and upper connectors 86, 88 to the first and second conductive rails 70, 72 respectively, as well as providing an electrical connection between the first terminal end 90 of first lower and upper connectors 86, 88 and the first and second conductive rails 70, 72 respectively. It is to be appreciated that the first and second retainers 94, 96 can be secured to the first and second conductive rails 70, 72 respectively or the first lower and upper connectors 86, 88 respectively by welding, soldering, bonding, adhesive, fasteners, and/or any other suitable method. It is to be appreciated that the first and second retainers 94, 96 can be any suitable configuration or orientation and FIGS. 9 and 13 are for illustrative purposes only. It is to further be appreciated that the first terminal end 90 of the first lower and upper connectors 86, 88 can be secured to the first and second conductive rails 70, 72 without utilizing the first and second retainers 94, 96. For example, the first lower and upper connectors 86, 88 can be secured to the first and second conductive rails 70, 72 respectively by soldering, welding, bonding, adhesive, fasteners, such as screws, rivets, etc., and/or any other suitable method. In addition, the first terminal end 90 of the first lower and upper connectors 86, 88 can engage the first and second conductive rails 70, 72 for electrically connecting therebetween. It is to also be appreciated that any suitable lead can electrically connect the first lower and upper connectors 86, 88 to the first and second conductive rails 70, 72.

In yet another embodiment as shown in FIGS. 2, 4, 6, 10, and 11 the sliding window assembly 20 further includes a second lower connector 98 coupled to the first conductive rail 70 and the first end 50 of the second heating grid 46 and a second upper connector 100 coupled to the second conductive rail 72 and the second end 52 of the second heating grid 46. Typically, the second lower and upper connectors 98, 100 are coupled to the sliding panel 42 on the same side. In other words, the second lower and upper connectors 98, 100 are coupled to the interior surface 34 of the sliding panel 42. Typically, the second lower and upper connectors 98, 100 are soldered to the second heating grid 46. It is to be appreciated that the second lower and upper connectors 98, 100 can be secured to the second heating grid 46 by any other suitable method such as, for example, welding, adhesive, bonding, etc.

The second lower and upper connectors 98, 100 are each further defined as a biasing member movable with the sliding panel 42 between the open and closed positions. Each of the biasing members continuously engages the inner surface 80 of the first and second conductive rails 70, 72 respectively during movement of the sliding panel 42 such that the second heating grid 46 remains electrically connected to the first and second conductive rails 70, 72 in both of the open and closed positions. The biasing member of the second lower and upper connectors 98, 100 can further be defined as a spring or any other suitable member. It is to be appreciated that the second lower and upper connectors 98, 100 can be any suitable configuration or orientation and FIGS. 10 and 11 are for illustrative purposes only. For example, the second lower and/or upper connectors 98, 100 can be rotated 90 degrees or any other suitable degree(s). It is to further be appreciated that the second lower and upper connectors 98, 100 can be coupled to the second heating grid 46 at any suitable location. In addition, it is to be appreciated that the second lower and upper connectors 98, 100 can be coupled to the first and second conductive rails 70, 72 respectively such that the sliding panel 42 moves back and forth relative to the connectors 98, 100. More specifically, the second lower connector 98 is coupled to the inner surface 80 of the first conductive rail 70 and the second upper connector 100 is coupled to the inner surface 80 of the second conductive rail 72 with the second heating grid 46 of the sliding panel 42 in continuous engagement with the second upper and lower connectors 98, 100 during movement of the sliding panel 42 such that the second heating grid 46 remains electrically connected to the first and second conductive rails 70, 72 in both the open and closed positions. The second lower and upper connectors 98, 100 can be secured to the second lower and upper connectors 98, 100 by soldering, welding, adhesive, bonding, and/or secured by any other suitable method.

In one embodiment, as shown in FIGS. 5A and 5B, the cable 45 and the conductive core 47 can be coupled to the first and second ends 50, 52 of the second heating grid 46. In another embodiment, as shown in FIG. 6, the cable 45 and the conductive core 47 can be coupled to one of the first and second ends 50, 52 of the second heating grid 46 proximal to the second lower connector 98 with the second upper connector 100 coupled to the other of the first and second ends 50, 52. It is to be appreciated that for the embodiment as shown in FIG. 6, the cable 45 and the conductive core 47 can be coupled to another end 101 of the second heating grid 46. The end 101 of the second heating grid 46 can be spaced from or proximal to the first and second ends 50, 52 of the second heating grid 46. As such, the cable 45 and the conductive core 47 can be coupled to the first end 50 and the end 101 of the second heating grid 46 such that the cable 45 moves the sliding panel 42 between the open and closed positions while the conductive core 47 energizes the second heating grid 46. Therefore, in the embodiment as shown in FIG. 6, the second heating grid 46 can be energized in two different ways; thus providing a back-up mechanism for the second heating grid 46 of the sliding panel 42. It is to be appreciated that the conductive core 47 can be coupled to the second heating grid 46 at any suitable location.

A power supply of the vehicle 22 is electrically connected to the conductive element 68 for flowing current, i.e. electrical current, through the conductive element 68 and the first and second heating grids 28, 46. More specifically, the power supply is electrically connected to the first and second conductive rails 70, 72. Typically, the power supply flows current through the first, second, and third heating grids 28, 46, 48. In other words, the power supply provides continuous flow of current through the first and second conductive rails 70, 72 and thus through the first, second, and/or third heating grids 28, 46, 48. The power supply includes a first output electrically connected to the first conductive rail 70 and a second output electrically connected to the second conductive rail 72. For example, the first output of the power supply is a negative charge and the second output of the power supply is a positive charge. It is to be appreciated that the first output can be the positive charge and the second output can be the negative charge. Typically, the current is a direct current (DC). It is to be appreciated that any other suitable current can be utilized.

As illustrated in FIGS. 2, 4, 5A, 5B, 6, 7, and 19 a plurality of connectors 102 are utilized to electrically connect the first and second conductive rails 70, 72 to the power supply. It is to be appreciated that at least one of the connectors 102 can be coupled to the first or third heating grids 28, 48 (instead of the first and second conductive rails 70, 72 as discussed below) as shown in FIGS. 5A and 7. For example, one of the connectors 102 is coupled to one of the first and second conductive rails 70, 72 and another one of the connectors 102 is coupled to one of the first and third heating grids 28, 48. Specifically, one of the connectors 102 is coupled to one of the first and second ends 50, 52 of the first or third heating grids 28, 48 and another one of the connectors 102 is coupled to one of the first and second conductive rails 70, 72. More specifically, FIG. 5A illustrates one of the connectors 102 coupled to the first end 50 of the third heating grid 48 and another one of the connectors 102 coupled to the second conductive rail 72. As such, the first and third heating grids 28, 48 are in continuous electrical connection to the first and second conductive rails 70, 72 in the parallel circuit.

Alternatively, as shown in FIGS. 2, 4, 5B, 6, and 19 the connectors 102 can be coupled to the first and second conductive rails 70, 72. For example, referring to FIG. 2, one of the connectors 102 is coupled to the first conductive rail 70 and another one of the connectors 102 is coupled to the second conductive rail 72 for electrically connecting the first and second heating grids 28, 46 to the first and second conductive rails 70, 72 in the parallel circuit. As another example, referring to FIGS. 4 and 6, one of the connectors 102 is coupled to the first conductive rail 70 and another one of the connectors 102 is coupled to the second conductive rail 72 for electrically connecting the first, second, and third heating grids 28, 46, 48 to the first and second conductive rails 70, 72 in the parallel circuit. As yet another example, referring to FIGS. 5B, 6, and 19, one of the connectors 102 is coupled to the first conductive rail 70 and another one of the connectors 102 is coupled to the second conductive rail 72 for electrically connecting the first and third heating grids 28, 48 to the first and second conductive rails 70, 72 such that the first and third heating grids 28, 48 are in continuous electrical connection to the first and second conductive rails 70, 72 in the parallel circuit. As such, if the electrical connection is broken in the first, second, or heating grids 28, 46, 48 the other heating grids 28, 46, 48 will continue to operate, etc.

It is to be appreciated that the first and second ends 50, 52 of the first and third heating grids 28, 48 can be at any suitable location. It is to further be appreciated that one connector 102 can be coupled to the first end 50 of one of the first and third heating grids 28, 48 and another connector 102 can be coupled to the second end 52 of the corresponding first or third heating grids 28, 48, etc. as further disclosed in U.S. patent application Ser. No. 12/944,444 filed concurrently with the subject application. It is to also be appreciated that at least one of the connectors 102 can be coupled to the second heating grid 46.

Typically, a wire harness 103 is utilized to electrically connect the first and second conductive rails 70, 72 to the power supply. It is to be appreciated that any suitable mechanism can be utilized to flow current through the first and second conductive rails 70, 72. It is to also be appreciated that current can flow through the entire first and second conductive rails 70, 72 or current can flow through a portion of the first and second conductive rails 70, 72. The wire harness 103 is typically coupled to the connectors 102.

In one example, as shown in FIG. 5A, the wire harness 103 is coupled to the connector 102 which is coupled to one of the first and third heating grids 28, 48 and the connector 102 which is coupled to one of the first and second conductive rails 70, 72. More specifically, FIG. 5A illustrates the wire harness 103 coupled to the connector 102 coupled to the third heating grid 48 and the connector 102 coupled to the second conductive rail 72. As such, current flows through the third heating grid 48 and the first heating grid 28 utilizing the first and second conductive rails 70, 72 and independent of the first and second conductive rails 70, 72, current flows through the second heating grid 46 utilizing the conductive core 47 electrically connected to the motor 43. In other words, as shown in FIG. 5A, current flows through the third heating grid 48, through one of the first and second conductive rails 70, 72, through the first heating grid 28, through the other one of the first and second conductive rails 70, 72 and out to the power supply and independently, current flows through the second heating grid 46 utilizing the conductive core 47 electrically connected to the motor 43. As such, the first and third heating grids 28, 48 are in the parallel circuit. It is to be appreciated for FIG. 5A, one of the connectors 102 can be coupled to the first heating grid 28 instead of the third heating grid 48.

In another example, as shown in FIGS. 2, 4, 5B, 6, and 19 the wire harness 103 is coupled to the connectors 102 which are coupled to the first and second conductive rails 70, 72. In FIG. 2, current flows through the first and second heating grids 28, 46 utilizing the first and second conductive rails 70, 72. Further, as shown in FIG. 2, the first and second heating grids 28, 46 are in continuous electrical connection to the first and second conductive rails 70, 72 in the parallel circuit such that current flows through the first and second heating grids 28, 46 independently of each other.

In FIGS. 4, and 6, current flows through the first, second, and third heating grids 28, 46, 48 utilizing the first and second conductive rails 70, 72. As shown in FIGS. 4 and 6, the first, second, and third heating grids 28, 46, 48 are in continuous electrical connection to the first and second conductive rails 70, 72 in the parallel circuit such that current flows through the first, second, and third heating grids 28, 46, 48 independently of each other. As mentioned above, FIG. 6 illustrates the back-up mechanism for the second heating grid 46, therefore, the first, second, and third heating grids 28, 46, 48 are in continuous electrical connection to the first and second conductive rails 70, 72 in the parallel circuit such that current flows through the first, second, and third heating grids 28, 46, 48 independently of each other and additionally, current flows through the second heating grid 46 utilizing the conductive core 47 electrically connected to the motor 43. As shown in FIG. 5B, the first and third heating grids 28, 48 are in continuous electrical connection to the first and second conductive rails 70, 72 in the parallel circuit such that current flows through the first and third heating grids 28, 48 independently of each other and independent of the first and third heating grids 28, 48, current flows through the second heating grid 46 utilizing the conductive core 47 electrically connected to the motor 43.

In addition, in FIG. 19, current flows through the first and third heating grids 28, 48 utilizing the first and second conductive rails 70, 72. Further, as shown in FIG. 19, the first and third heating grids 28, 48 are in continuous electrical connection to the first and second conductive rails 70, 72 in the parallel circuit such that current flows through the first and third heating grids 28, 48 independently of each other.

It is to be appreciated that any suitable mechanism can be utilized to flow current through the first and second conductive rails 70, 72 and the first, second, and/or third heating grids 28, 46, 48. It is to also be appreciated that current can flow through the entire first and second conductive rails 70, 72 or current can flow through a portion of the first and second conductive rails 70, 72. Further, it is to be appreciated that the connectors 102 and the wire harness 103 can be in any suitable location.

Figure 16:
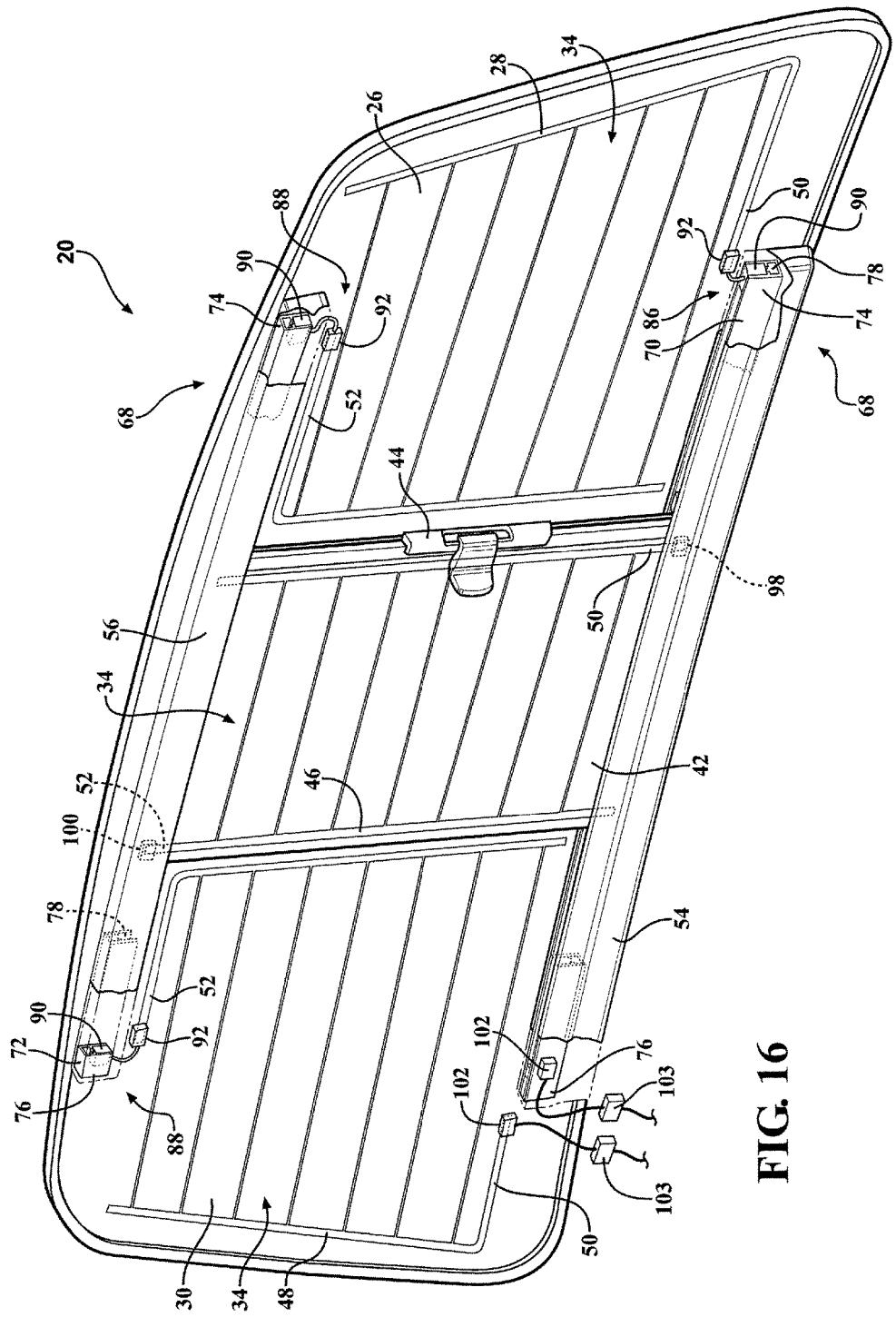
FIG. 16 is a perspective view of an interior of the sliding window assembly of another alternative embodiment with at least the first and third heating grids in a series circuit.
Figure 17:
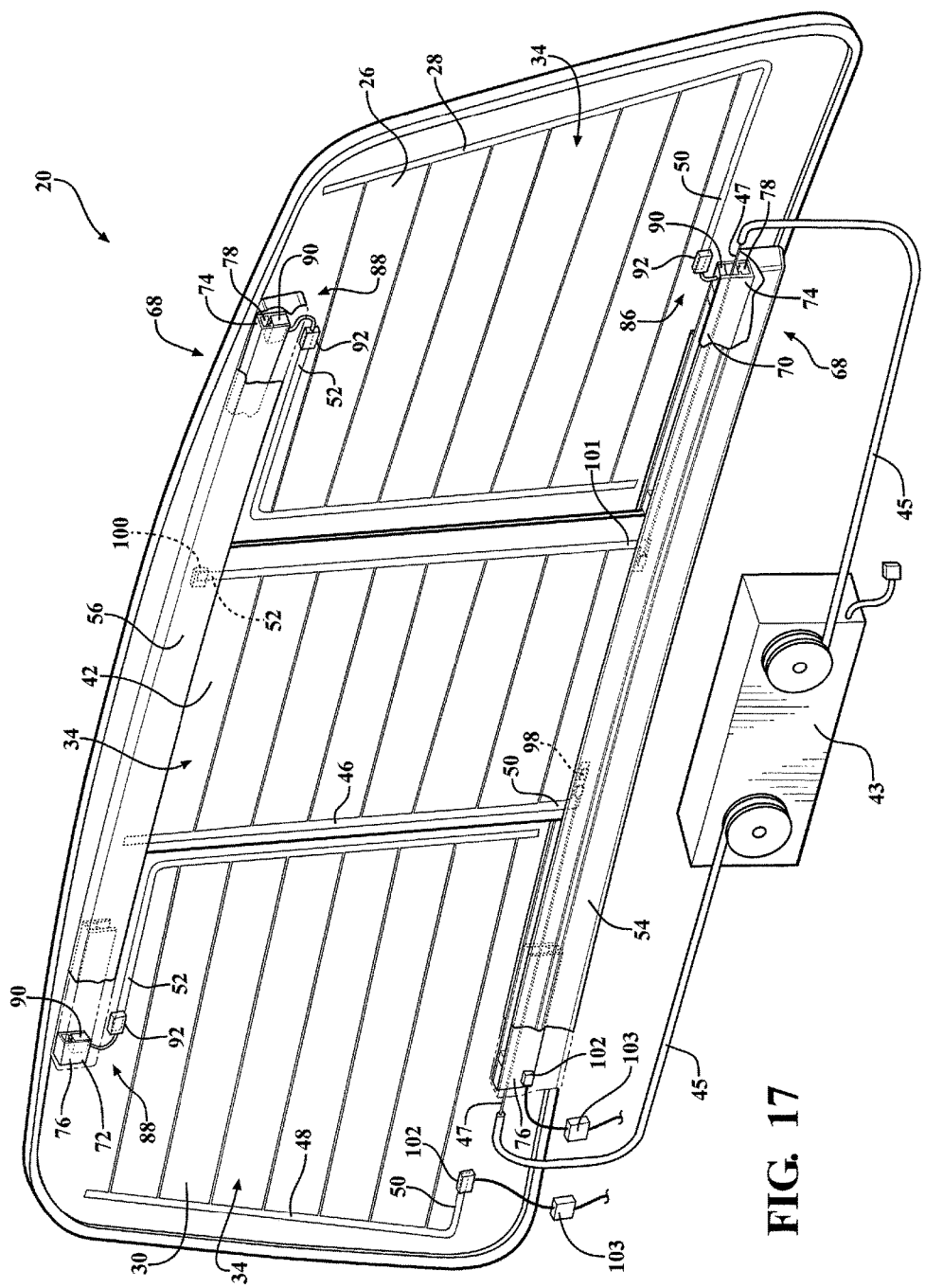
FIG. 17 is a perspective view of an interior of the sliding window assembly of yet another alternative embodiment with at least the first and third heating grids in a series circuit.
Figure 18:
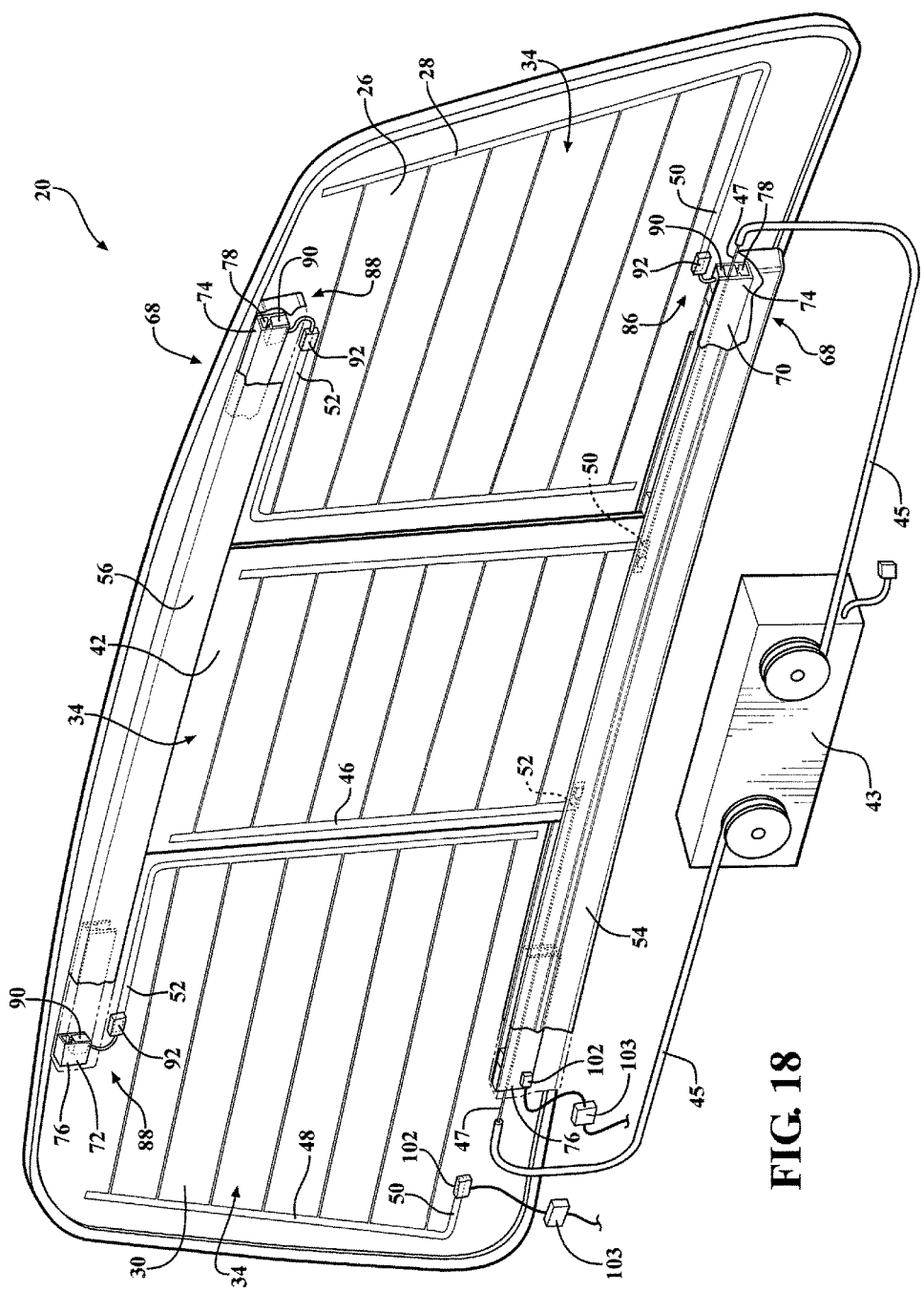
FIG. 18 is a perspective view of an interior of the sliding window assembly of yet another alternative embodiment with the first and third heating grids electrically connected in a series circuit.

In certain embodiments, as shown in FIGS. 16-18, the first and third heating grids 28, 48 are in continuous electrical connection to the conductive rail 68 in the series circuit. More specifically, the first and third heating grids 28, 48 are in continuous electrical connection to the first and second conductive rails 70, 72 in the series circuit. As such, current flows through one of the first and third heating grids 28, 48, through one of the first and second conductive rails 70, 72, through the other one of the first and third heating grids 28, 48, through the other one of the first and second conductive rails 70, 72 and out to the power supply.

FIGS. 16-18 illustrate one of the connectors 102 coupled to one of the first and second conductive rails 70, 72 and another one of the connectors 102 coupled to one of the first and third heating grids 28, 48 such that the first and third heating grids 28, 48 are in continuous electrical connection in the series circuit. More specifically, FIGS. 16-18 illustrate one connector 102 coupled to the first end 50 of the third heating grid 48 and another connector 102 coupled to the second rail end 76 of the first conductive rail 70. For the embodiments of FIGS. 16-18, one of the first lower and upper connectors 86, 88 can be eliminated. For example, one of the first lower connectors 86 has been eliminated such that current flows through the first and third heating grids 28, 48 in the series circuit.

Further, FIGS. 16 and 17 both illustrate utilizing the second lower and upper connectors 98, 100 electrically connected to the first and second conductive rails 70, 72. Hence, the second heating grid 46 is in the parallel circuit with the first heating grid 28 and the second heating grid 46 is in the series circuit with the third heating grid 48. In addition, FIG. 17 illustrates the back-up mechanism of energizing the second heating grid 46 in two different ways. As such, current can also flow through the second heating grid 46 independently of the first and third heating grids 28, 48 utilizing the conductive core 47 electrically connected to the motor 43. It is to be appreciated that for any of these embodiments/alternatives, the back-up mechanism is optional. Additionally, FIG. 18 illustrates that current can also flow through the second heating grid 46 independently of the first and third heating grids 28, 48 utilizing the conductive core 47 electrically connected to the motor 43 without utilizing the back-up mechanism.

In various alternative embodiments, as shown in FIGS. 14A, 14B, 14C, and 15, one of the first and second conductive rails 70, 72 are eliminated. In these alternatives, typically the first conductive rail 70 includes a first conductive segment 104 and a second conductive segment 106 spaced from each other with an insulator segment 108 disposed between the first and second conductive segments 104, 106. Typically, one of the connectors 102 is coupled to the first conductive segment 104 and another one of the connectors 102 is coupled to the second conductive segment 106 with the wire harness 103 coupled to the connectors 102 to electrically connect the first and second conductive segments 104, 106 to the power supply as discussed above. The connectors 102, the wire harness 103, and the power supply are discussed above and therefore will not be re-discussed here.

For the alternative embodiments as shown in FIGS. 14A, 14B, 14C, and 15, the first and third heating grids 28, 48 are in continuous electrical connection to the first and second conductive segments 104, 106. In one alternative, the first, second, and third heating grids 28, 46, 48 are in continuous electrical connection to the first and second conductive segments 104, 106 such that the first, second, and third heating grids 28, 46, 48 remain electrically connected to the first and second conductive segments 104, 106 in both of the open and closed positions of the sliding panel 42. Specifically, the first, second, and third heating grids 28, 46, 48 are in continuous electrical connection to the first conductive rail 70, and more specifically, to the first and second conductive segments 104, 106 in the parallel circuit. It is to be appreciated that other configurations or orientations of the first and second conductive segments 104, 106 can be utilized to create the parallel circuit, such as, for example, a plurality of first conductive segments 104 spaced from each other and each electrically connected to respective heating grids 28, 46, 48 and a plurality of second conductive segments 106 spaced from each other and each electrically connected to respective heating grids 28, 46, 48. It is to further be appreciated that when utilizing a plurality of first and second conductive segments 104, 106, a plurality of insulator segments 108 can correspondingly be utilized to space each of the first and/or second segments 104, 106 apart. It is to also be appreciated that the first, second, and third heating grids 28, 46, 48 can be in continuous electrical connection in the parallel circuit without utilizing the first and second conductive segments 104, 106, such as, for example, electrical wires can be coupled to each of the heating grids 28, 46, 48 in the parallel circuit.

Each of the segments 104, 106, 108 are coupled to the track 54 with the first and second heating grids 28, 46 in continuous electrical connection to the first and second conductive segments 104, 106. In other words, the first and second conductive segments 104, 106 and the insulator segment 108 are coupled to one of the first and second tracks 54, 56. Typically, the first and second conductive segments 104, 106 and the insulator segment 108 are coupled to the first track 54. Therefore, in these alternatives, the second track 56 and/or the second conductive rail 72 can optionally be eliminated. It is to be appreciated that the second conductive rail 72 can include the first and second conductive segments 104, 106 and the insulator segment 108 instead of the first conductive rail 70. In addition, it is to be appreciated that the first and second conductive segments 104, 106 and the insulator segment 108 can be coupled to the second track 56 instead of the first track 54. Further, it is to be appreciated that the second track 56 can be utilized without the second conductive rail 72 for receiving and/or guiding the sliding panel 42 during movement between the open and closed positions. Additionally, a non-conductive rail can be coupled to the second track 56 when the first conductive rail 70 is coupled to the first track 54 for receiving and/or guiding the sliding panel 42 and vise versa.

The insulator segment 108 can be coupled to the first and second conductive segments 104, 106 by bonding, welding, adhesive, encapsulation as discussed above, or any other suitable method. The insulator segment 108 can be formed of polymeric material(s) and more typically plastic material(s). The plastic material(s) can be thermoplastic material(s) and/or thermoset material(s). In certain embodiments, the plastic material can be nylon or polyvinyl chloride (PVC). It is to be appreciated that the insulator segment 108 can be formed from various plastic material(s), such as, for example, thermoplastic elastomers (TPE); elastomeric alloys, e.g. thermoplastic vulcanizates (TPV); thermoplastic polyolefins (TPO); thermoplastic styrene (TPS); polyurethane; and various different types of reaction injection molding (RIM) materials; and/or any other suitable material(s) for encapsulation. One example of a suitable polyurethane is commercially available from BASF Corporation under the tradename of COLO-FAST™, e.g. COLO-FAST™ LM-161. It is to be appreciated that the insulator segment 108 can be formed of any non-conductive material(s). In other words, the insulator segment 108 can be any suitable material for inhibiting the flow of current between the first and second conductive segments 104, 106.

The first and second conductive segments 104, 106 can define different configurations or orientations as shown in FIGS. 14A, 14B, 14C, and 15. In the embodiment shown in FIGS. 14A, 14B, and 14C, the first and second conductive segments 104, 106 extend outwardly away from the insulator segment 108 in a substantially parallel relationship to define the channel 78 therebetween for receiving the sliding panel 42. In one alternative, the first and third heating grids 28, 48 are electrically connected to the first and second conductive segments 104, 106. In another alternative, the first, second, and third heating grids 28, 46, 48 are electrically connected to the first and second conductive segments 104, 106. More specifically, the first, second, and third heating grids 28, 46, 48 remain electrically connected to the first and second conductive segments 104, 106 in both of the open and closed positions of the sliding panel 42.

The first lower connectors 86 are each coupled to the first conductive segment 104 and the first upper connectors 88 are each coupled to the second conductive segment 106 for electrically connecting the first conductive rail 70 to the first and third heating grids 28, 48. Hence, the first and second ends 50, 52 of the first and third heating grids 28, 48 are proximal to the first conductive rail 70. Likewise, the second lower connector 98 is coupled to the first conductive segment 104 and the second upper connector 100 is coupled to the second conductive segment 106 for electrically connecting the first conductive rail 70 to the second heating grid 46. Hence, the first and second ends 50, 52 of the second heating grid 46 are proximal to the first conductive rail 70.

The first terminal end 90 of each of the first lower connectors 86 are coupled to the first conductive segment 104 and spaced from the second conductive segment 106. Likewise, the first terminal end 90 of each of the first upper connectors 88 are coupled to the second conductive segment 106 and spaced from the first conductive segment 104. The first and second terminal ends 90, 92 of each of the first lower and upper connectors 86, 88 are configured and coupled to the respective ends 50, 52 of the first and third heating grids 28, 48 and the first and second conductive segments 104, 106 as discussed above and will therefore not be discussed further. It is to be appreciated that the first terminal end 90 of the first lower and upper connectors 86, 88 are coupled to the inner surface 80 of the channel 78 of the first conductive rail 70 or any other suitable location.

The second lower connector 98 is coupled to the first conductive segment 104 and the first end 50 of the second heating grid 46 and the second upper connector 100 is coupled to the second conductive segment 106 and the second end 52 of the second heating grid 46. The second lower and upper connectors 98, 100 are each further defined as the biasing member as discussed above with the biasing member movable with the sliding panel 42 between the open and closed positions. One of the biasing members continuously engages the first conductive segment 104 and another one of the biasing members continuously engages the second conductive segment 106 during movement of the sliding panel 42 such that the second heating grid 46 remains electrically connected to the first and second conductive segments 104, 106 in both of the open and closed positions. It is to be appreciated that the biasing members continuously engage the inner surface 80 of the channel 78 of the first conductive rail 70 or any other suitable location.

The second lower and upper connectors 98, 100 are coupled to the sliding panel 42 on opposite sides such that the second lower connector 98 is electrically connected to the first conductive segment 104 and the second upper connector 100 is electrically connected to the second conductive segment 106. In other words, the second lower connector 98 is coupled to the exterior surface 38 of the sliding panel 42 and the second upper connector 100 is coupled to the interior surface 34 of the sliding panel 42. The first and second ends 50, 52 of the second heating grid 46 are disposed one side of the sliding panel 42 as discussed above; therefore, as best shown in FIG. 14B, the sliding panel 42 defines a hole 110 with the second lower connector 98 disposed through the hole 110 and coupled to the exterior surface 38 of the sliding panel 42 for electrically connecting the first end 50 of the second heating grid 46 to the first conductive segment 104. It is to be appreciated that the second lower and upper connectors 98, 100 can be configured and coupled to the sliding panel 42 as discussed above and therefore will not be discussed further.

Figure 15:
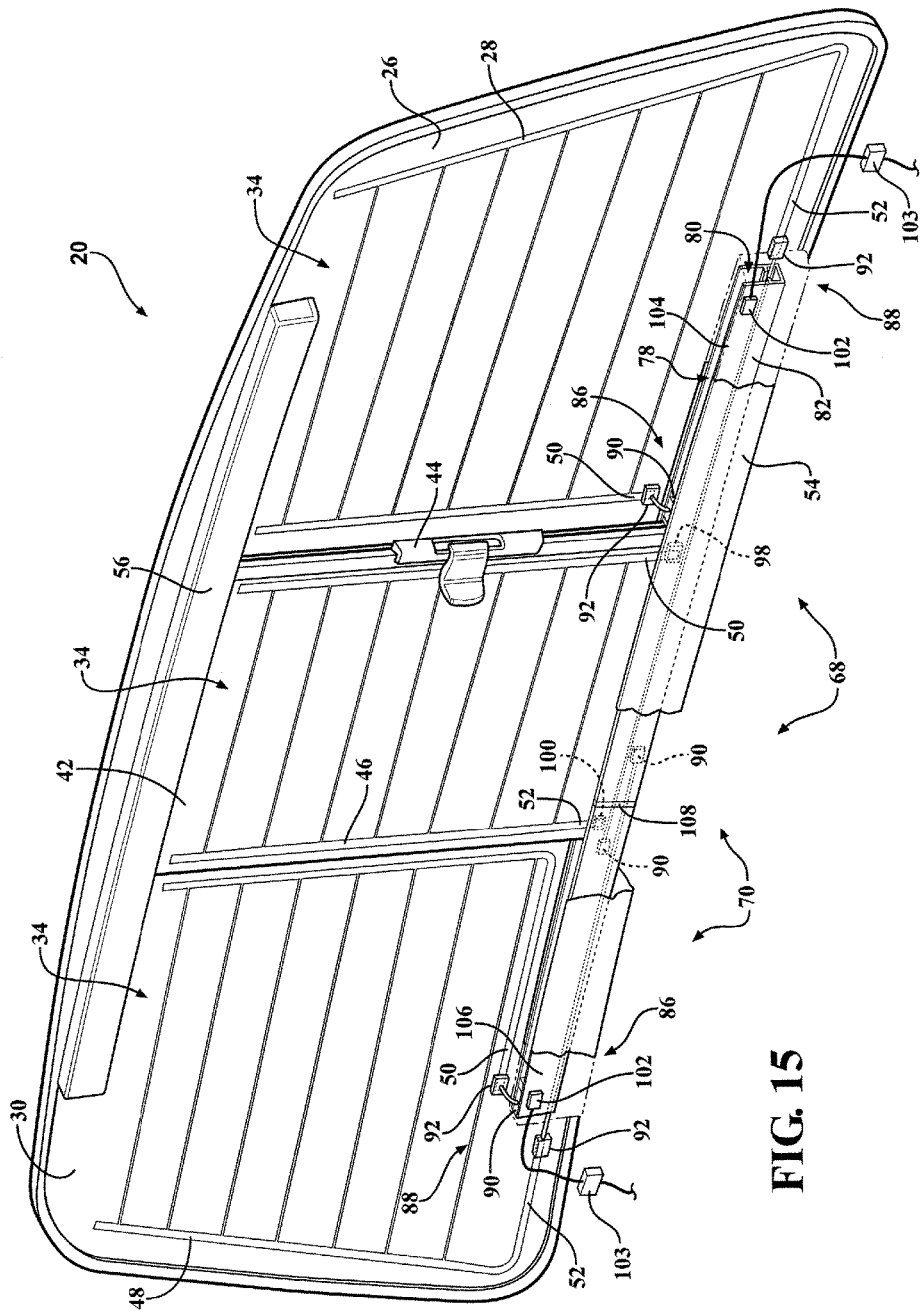
FIG. 15 is a perspective view of an interior of the sliding window assembly of another alternative embodiment including a first conductive rail having a first conductive segment and a second conductive segment.

In the other embodiment, as shown in FIG. 15, the first conductive segment 104, the second conductive segment 106, and the insulator segment 108 align with each other in a row to form one conductive rail. The insulator segment 108 is disposed between the first and second conductive segments 104, 106. In this embodiment, the first and second conductive segments 104, 106 and the insulator segment 108 each define the channel 78 such that the sliding panel 42 is movably disposed in the channel 78 of each of the first and second conductive segments 104, 106 and the insulator segment 108.

The first terminal end 90 of each of the first lower connectors 86 are coupled to the first conductive segment 104. Likewise, the first terminal end 90 of each of the first upper connectors 88 are coupled to the second conductive segment 106. In this embodiment, the second terminal end 92 of one of the first lower connectors 86 is coupled to the first end 50 of the first heating grid 28 and the second terminal end 92 of another one of the first lower connectors 86 is coupled to the second end 52 of the third heating grid 48. In addition, the second terminal end 92 of one of the first upper connectors 88 is coupled to the second end 52 of the first heating grid 28 and the second terminal end 92 of another one of the first upper connectors 88 is coupled to first end 50 of the third heating grid 48.

The first terminal end 90 of one of the first lower connectors 86 is fed through the channel 78 of the second conductive segment 106 and the insulator segment 108 and into the channel 78 of the first conductive segment 104 such that the first terminal end 90 can be coupled to the first conductive segment 104. Likewise, the first terminal end 90 of one of the first upper connectors 88 is fed through the channel 78 of the first conductive segment 104 and the insulator segment 108 and into the channel 78 of the second conductive segment 106 such that the first terminal end 90 can be coupled to the second conductive segment 106. It is to be appreciated that the first terminal end 90 of each of the first lower and upper connectors 86, 88 can be coupled to respective first and second conductive segments 104, 106 in any suitable location. In addition, it is to be appreciated that the first terminal end 90 of the first lower and upper connectors 86, 88 are coupled to the inner surface 80 of the channel 78 of the first conductive rail 70 or any other suitable location.

The second lower connector 98 is coupled to the first conductive segment 104 and the first end 50 of the second heating grid 46 and the second upper connector 100 is coupled to the second conductive segment 106 and the second end 52 of the second heating grid 46. The second lower and upper connectors 98, 100 are coupled to the sliding panel 42 on the same side such that the second lower connector 98 is electrically connected to the first conductive segment 104 and the second upper connector 100 is electrically connected to the second conductive segment 106. In other words, the second lower and upper connectors 98, 100 are coupled to the interior surface 34 of the sliding panel 42. When the sliding panel 42 is in the closed position, the second upper connector 100 is disposed proximal to the insulator segment 108 and when the sliding panel 42 is in the opened position, the second lower connector 98 moves toward the second conductive segment 106. It is to be appreciated when the sliding panel 42 is completely uncovering the opening 32, the second lower connector 98 is disposed proximal to the insulator segment 108.

The second lower and upper connectors 98, 100 are each further defined as the biasing member as discussed above with the biasing member movable with the sliding panel 42 between the open and closed positions. One of the biasing members continuously engages the first conductive segment 104 and another one of the biasing members continuously engages the second conductive segment 106 during movement of the sliding panel 42 such that the second heating grid 46 remains electrically connected to the first and second conductive segments 104, 106 in both of the open and closed positions. It is to be appreciated that the biasing members continuously engage the inner surface 80 of the channel 78 of the first conductive rail 70 or any other suitable location. It is to be appreciated that the second lower and upper connectors 98, 100 can be configured and coupled to the sliding panel 42 as discussed above and therefore will not be discussed further. It is to further be appreciated that the first and second terminal ends 90, 92 of each of the first lower and upper connectors 86, 88 are configured and coupled to the respective ends 50, 52 of the first and third heating grids 28, 48 and the first and second conductive segments 104, 106 as discussed above and will therefore not be discussed further.

For illustrative purposes only, some of the details of at least FIGS. 2, 4, 5A, 5B, 6, 14A, 14B, 14C, and 15-19 are not shown for illustrating other components of the subject invention. It is to be appreciated that various mechanical and electrical components of the subject invention can be re-orientated or relocated to accommodate various mechanical and electrical components as disclosed in the embodiments/alternatives of U.S. patent application Ser. No. 12/944,444 filed concurrently with the subject application.

Many modifications and variations of the subject invention are possible in light of the above teachings. The foregoing invention has been described in accordance with the relevant legal standards; thus, the description is exemplary rather than limiting in nature. Variations and modifications to the disclosed embodiment can become apparent to those skilled in the art and do come within the scope of the invention. Accordingly, the scope of legal protection afforded this invention can only be determined by studying the following claims.

What is claimed is:

1. A sliding window assembly for a vehicle, said assembly comprising:
    a first fixed panel adapted to be fixed to the vehicle;
    a second fixed panel adapted to be fixed to the vehicle and spaced from said first fixed panel;
    a first heating grid coupled to said first fixed panel for defrosting said first fixed panel;
    a track coupled to said first and second fixed panels;
    a sliding panel movably coupled to said track such that said sliding panel moves relative to said first and second fixed panels between an open position and a closed position;
    a second heating grid coupled to said sliding panel for defrosting said sliding panel; and
    said track including a conductive element interconnecting said first and second fixed panels to prevent movement of said first and second fixed panels relative to each other, with said conductive element defining a general u-shaped channel with an edge of said sliding panel disposed within said u-shaped channel and with said conductive element in continuous electrical connection to said first and second heating grids such that said first and second heating grids remain electrically connected to said conductive element in both of said open and closed positions of said sliding panel.

2. A sliding window assembly as set forth in claim 1 wherein said first and second heating grids are in continuous electrical connection to said conductive element in a parallel circuit.

3. A sliding window assembly as set forth in claim 1 wherein said conductive element is further defined as a first conductive rail coupled to said track and receiving said sliding panel.

4. A sliding window assembly as set forth in claim 3 wherein said track is further defined as a first track and further including a second track coupled to said fixed panel above said first track and said sliding panel is movably coupled to said first and second tracks with said first conductive rail coupled to one of said first and second tracks.

5. A sliding window assembly as set forth in claim 4 wherein said conductive element further includes a second conductive rail spaced from said first conductive rail and receiving said sliding panel with said first conductive rail coupled to said first track and said second conductive rail coupled to said second track.

6. A sliding window assembly as set forth in claim 5 wherein said fixed panel is further defined as a first fixed panel and further including a second fixed panel adapted to be fixed to the vehicle such that said first and second fixed panels are spaced from each other to define an opening therebetween with said sliding panel covering said opening when in said closed position and said sliding panel uncovering said opening when in said open position and wherein a third heating grid is coupled to said second fixed panel and in continuous electrical connection to said first and second conductive rails such that said first, second, and third heating grids remain electrically connected to said first and second conductive rails in both of said open and closed positions of said sliding panel.

7. A sliding window assembly as set forth in claim 6 wherein said first, second, and third heating grids are in continuous electrical connection to said first and second conductive rails in a parallel circuit.

8. A sliding window assembly as set forth in claim 6 further including a plurality of first lower connectors each coupled to said first conductive rail and respective first and third heating grids and further including a plurality of first upper connectors each coupled to said second conductive rail and respective first and third heating grids for electrically connecting said first and second conductive rails to said first and third heating grids and wherein said first lower and upper connectors each include a first terminal end and a second terminal end with said first terminal end of each of said first lower connectors coupled to said first conductive rail and said second terminal end of each of said first lower connectors coupled to respective first and third heating grids and said first terminal end of each of said first upper connectors coupled to said second conductive rail and said second terminal end of each of said first upper connectors coupled to respective first and third heating grids.

9. A sliding window assembly as set forth in claim 8 wherein said first and second conductive rails each include a first rail end and a second rail end spaced from each other with said channel of each of said first and second conductive rails defined between said first and second rail ends for receiving said sliding panel and wherein said channel of each of said first and second conductive rails presents an inner surface with said first terminal end of each of said first lower connectors engaging said inner surface of said first conductive rail and said first terminal end of each of said first upper connectors engaging said inner surface of said second conductive rail.

10. A sliding window assembly as set forth in claim 9 wherein each of said first, second, and third heating grids include a first end with said second terminal end of one of said first lower connectors coupled to said first end of said first heating grid and said second terminal end of another one of said first lower connectors coupled to said first end of said third heating grid.

11. A sliding window assembly as set forth in claim 10 wherein each of said first, second, and third heating grids include a second end spaced from said first end of respective first, second, and third heating grids with said second terminal end of one of said first upper connectors coupled to said second end of said first heating grid and said second terminal end of another one of said first upper connectors coupled to said second end of said third heating grid.

12. A sliding window assembly as set forth in claim 8 wherein one of said first conductive rail and said first lower connectors include a plurality of first retainers spaced from each other for securing said first terminal end of said first lower connectors to said first conductive rail.

13. A sliding window assembly as set forth in claim 8 wherein one of said second conductive rail and said first upper connectors include a plurality of second retainers spaced from each other for securing said first terminal end of said first upper connectors to said second conductive rail.

14. A sliding window assembly as set forth in claim 11 further including a second lower connector coupled to said first conductive rail and said first end of said second heating grid and a second upper connector coupled to said second conductive rail and said second end of said second heating grid.

15. A sliding window assembly as set forth in claim 14 wherein said second lower and upper connectors are each further defined as a biasing member movable with said sliding panel between said open and closed positions such that each of said biasing members continuously engage said inner surface of said first and second conductive rails respectively during movement of said sliding panel.

16. A sliding window assembly as set forth in claim 5 further including a plurality of connectors with one of said connectors coupled to said first conductive rail and another one of said connectors coupled to said second conductive rail for electrically connecting said first and second heating grids to said first and second conductive rails.

17. A sliding window assembly as set forth in claim 6 further including a plurality of connectors with one of said connectors coupled to said first conductive rail and another one of said connectors coupled to said second conductive rail for electrically connecting said first, second, and third heating grids to said first and second conductive rails.

18. A sliding window assembly as set forth in claim 6 further including a plurality of connectors with one of said connectors coupled to one of said first and second conductive rails and another one of said connectors coupled to one of said first and third heating grids.

19. A sliding window assembly as set forth in claim 3 wherein said first conductive rail includes a first conductive segment and a second conductive segment spaced from each other with an insulator segment disposed between said first and second conductive segments and each segment coupled to said track with said first and second heating grids in continuous electrical connection to said first and second conductive segments.

20. A sliding window assembly as set forth in claim 19 wherein said first and second conductive segments extend outwardly away from said insulator segment in a substantially parallel relationship to define a channel therebetween for receiving said sliding panel.

21. A sliding window assembly as set forth in claim 20 wherein said fixed panel is further defined as a first fixed panel and further including a second fixed panel adapted to be fixed to the vehicle and wherein a third heating grid is coupled to said second fixed panel and in continuous electrical connection to said first and second conductive segments such that said first, second, and third heating grids remain electrically connected to said first and second conductive segments in both of said open and closed positions of said sliding panel.

22. A sliding window assembly for a vehicle, said assembly comprising:
a first fixed panel adapted to be fixed to the vehicle;
a left heating grid coupled to said first fixed panel for defrosting said first fixed panel;
a second fixed panel adapted to be fixed to the vehicle and spaced from said first fixed panel to define an opening therebetween;
a right heating grid coupled to said second fixed panel for defrosting said second fixed panel;
a track coupled to said first and second fixed panels;
a sliding panel movably coupled to said track such that said sliding panel moves relative to said first and second fixed panels between an open position uncovering said opening and a closed position covering said opening;
a center heating grid coupled to said sliding panel for defrosting said sliding panel; and
said track including a conductive rail interconnecting said first and second fixed panels to prevent movement of said first and second fixed panels relative to each other with said conductive element defining a general u-shaped channel with an edge of said sliding panel disposed within said u-shaped channel and with said conductive rail in continuous electrical connection to said left, right, and center heating grids such that said left, right, and center heating grids remain electrically connected to said conductive rail in both of said open and closed positions.

23. A sliding window assembly as set forth in claim 22 wherein said left, right, and center heating grids are in continuous electrical connection to said conductive rail in a parallel circuit.

24. A sliding window assembly as set forth in claim 22 wherein said track is further defined as a first track and further including a second track coupled to said first and second fixed panels above said first track and said sliding panel movably coupled to said first and second tracks and wherein said conductive element is further defined as a first conductive rail and further including a second conductive rail spaced from said first conductive rail and each receiving said sliding panel with said first conductive rail coupled to said first track and said second conductive rail coupled to said second track.

25. A sliding window assembly as set forth in claim 24 further including a plurality of first lower connectors each coupled to said first conductive rail and respective left and right heating grids and further including a plurality of first upper connectors each coupled to said second conductive rail and respective left and right heating grids for electrically connecting said first and second conductive rails to said left and right heating grids and wherein said first lower and upper connectors each include a first terminal end and a second terminal end with said first terminal end of each of said first lower connectors coupled to said first conductive rail and said second terminal end of each of said first lower connectors coupled to respective left and right heating grids and said first terminal end of each of said first upper connectors coupled to said second conductive rail and said second terminal end of each of said upper connectors coupled to respective left and right heating grids.

26. A sliding window assembly as set forth in claim 25 wherein said first and second conductive rails each include a first rail end and a second rail end spaced from each other and wherein said channel of each of said first and second conductive rails is defined between said first and second rail ends for receiving said sliding panel and wherein said channel of each of said first and second conductive rails presents an inner surface with said first terminal end of each of said first lower connectors engaging said inner surface of said first conductive rail and said first terminal end of each of said first upper connectors engaging said inner surface of said second conductive rail.

27. A sliding window assembly as set forth in claim 25 wherein each of said left, right, and center heating grids include a first end with said second terminal end of one of said first lower connectors coupled to said first end of said left heating grid and said second terminal end of another one of said first lower connectors coupled to said first end of said right heating grid.

28. A sliding window assembly as set forth in claim 27 wherein each of said left, right, and center heating grids include a second end spaced from said first end of respective left, right, and center heating grids with said second terminal end of one of said first upper connectors coupled to said second end of said left heating grid and said second terminal end of another one of said first upper connectors coupled to said second end of said right heating grid.

29. A sliding window assembly as set forth in claim 26 wherein one of said first conductive rail and said first lower connectors include a plurality of first retainers spaced from each other for securing said first terminal end of said first lower connectors to said first conductive rail.

30. A sliding window assembly as set forth in claim 26 wherein one of said second conductive rail and said first upper connectors include a plurality of second retainers spaced from each other for securing said first terminal end of said first upper connectors to said second conductive rail.

31. A sliding window assembly as set forth in claim 28 further including a second lower connector coupled to said first conductive rail and said first end of said center heating grid and a second upper connector coupled to said second conductive rail and said second end of said center heating grid.

32. A sliding window assembly as set forth in claim 31 wherein said second lower and upper connectors are each further defined as a biasing member movable with said sliding panel between said open and closed positions such that each of said biasing members continuously engage said inner surface of said first and second conductive rails respectively during movement of said sliding panel.

33. A sliding window assembly as set forth in claim 24 further including a plurality of connectors with one of said connectors coupled to said first conductive rail and another one of said connectors coupled to said second conductive rail for electrically connecting said left, right, and center heating grids to said first and second conductive rails.

34. A sliding window assembly as set forth in claim 24 further including a plurality of connectors with one of said connectors coupled to one of said first and second conductive rails and another one of said connectors coupled to one of said left and right heating grids.

35. A sliding window assembly for a vehicle, said assembly comprising:
a first fixed panel adapted to be fixed to the vehicle;
a left heating grid coupled to said first fixed panel for defrosting said first fixed panel;
a second fixed panel adapted to be fixed to the vehicle and spaced from said first fixed panel to define an opening therebetween;
a right heating grid coupled to said second fixed panel for defrosting said second fixed panel;
a track coupled to said first and second fixed panels; and said track including a conductive rail interconnecting said first and second fixed panels to prevent movement of said first and second fixed panels relative to each other with said conductive element defining a general u-shaped channel with an edge of said sliding panel disposed within said u-shaped channel and with said conductive rail in continuous electrical connection to said left and right heating grids for defrosting said first and second fixed panels.

36. A sliding window assembly as set forth in claim 35 wherein said left and right heating grids are in continuous electrical connection to said conductive rail in a parallel circuit.

37. A sliding window assembly as set forth in claim 35 wherein said track is further defined as a first track and further including a second track coupled to said first and second fixed panels above said first track and wherein said conductive rail is further defined as a first conductive rail coupled to said first track and further including a second conductive rail spaced from said first conductive rail and coupled to said second track with said left and right heating grids in continuous electrical connection to said first and second conductive rails.

38. A sliding window assembly as set forth in claim 35 further including a sliding panel movably coupled to said track with a cable coupled to said sliding panel for moving said sliding panel relative to said first and second fixed panels between an open position uncovering said opening and a closed position covering said opening.

39. A sliding window assembly as set forth in claim 38 further including a center heating grid coupled to said sliding panel for defrosting said sliding panel with a conductive core electrically connected to said center heating grid and coupled with said cable such that said conductive core moves concurrently with said cable as said cable moves said sliding panel between said open and closed positions.

40. A sliding window assembly as set forth in claim 37 further including a plurality of connectors with one of said connectors coupled to said first conductive rail and another one of said connectors coupled to said second conductive rail such that said left and right heating grids are in continuous electrical connection to said first and second conductive rails in a parallel circuit.

41. A sliding window assembly as set forth in claim 37 further including a plurality of connectors with one of said connectors coupled to one of said first and second conductive rails and another one of said connectors coupled to one of said left and right heating grids such that said left and right heating grids are in continuous electrical connection to said first and second conductive rails in a parallel circuit.

42. A sliding window assembly as set forth in claim 37 further including a plurality of connectors with one of said connectors coupled to one of said first and second conductive rails and another one of said connectors coupled to one of said left and right heating grids such that said left and right heating grids are in continuous electrical connection in a series circuit.

43. A sliding window assembly as set forth in claim 37 further including a sliding panel movably coupled to said first and second tracks and a center heating grid coupled to said sliding panel and wherein said left and right heating grids are electrically connected to said first and second conductive rails and said center heating grid is electrically connected to said conductive core independently of said first and second conductive rails.

44. A sliding window assembly as set forth in claim 35 wherein said left and right heating grids are in continuous electrical connection to said conductive rail in a series circuit.

* * * * *